US010421016B2

(12) United States Patent
Kogure

(10) Patent No.: US 10,421,016 B2
(45) Date of Patent: Sep. 24, 2019

(54) GAME SYSTEM, TRADE REQUEST ACCEPTANCE DEVICE, AND INFORMATION STORAGE MEDIUM

(71) Applicant: KONAMI DIGITAL ENTERTAINMENT CO., LTD., Tokyo (JP)

(72) Inventor: Christine Mariko Kogure, Tokyo (JP)

(73) Assignee: KONAMI DIGITAL ENTERTAINMENT CO., LTD., Tokyo (JP)

(*) Notice: Subject to any disclaimer, the term of this patent is extended or adjusted under 35 U.S.C. 154(b) by 262 days.

(21) Appl. No.: 15/456,597

(22) Filed: Mar. 13, 2017

(65) Prior Publication Data
US 2017/0182417 A1 Jun. 29, 2017

Related U.S. Application Data

(63) Continuation of application No. PCT/JP2015/075341, filed on Sep. 7, 2015.

(30) Foreign Application Priority Data

Sep. 30, 2014 (JP) .................. 2014-200746

(51) Int. Cl.
A63F 13/5372 (2014.01)
A63F 13/35 (2014.01)
(Continued)

(52) U.S. Cl.
CPC .......... A63F 13/5372 (2014.09); A63F 13/35 (2014.09); A63F 13/533 (2014.09);
(Continued)

(58) Field of Classification Search
USPC .......................................... 463/31
See application file for complete search history.

(56) References Cited

U.S. PATENT DOCUMENTS

2015/0032579 A1* 1/2015 Jacobs .................. G06Q 40/00
705/26.82
2017/0352108 A9* 12/2017 Domey .............. G06Q 30/0625

FOREIGN PATENT DOCUMENTS

JP 2014000103 A 1/2014

OTHER PUBLICATIONS

English Translation of International Search Report for PCT/JP2015/075341 dated Oct. 6, 2015.
(Continued)

Primary Examiner — Pierre E Elisca
(74) Attorney, Agent, or Firm — HEA Law PLLC

(57) ABSTRACT

A game system comprising at least one processor configured to: receive, from a second user identified by second user identification information, an exchange request for exchanging a desired game object for an offered game object, the at least one first desired game object being selected from a first group of game objects associated with the first user identification information of a first user, the at least one first offered game object being selected from a group of second game objects associated with the second user identification information; exchange the first desired game object for the first offered game object based on the exchange request; and receive a selection of any combination of game objects which comprise are at least one of the first desired game object and/or the first offered game object, in one an exchange.

13 Claims, 24 Drawing Sheets

(51) Int. Cl.
    *A63F 13/533* (2014.01)
    *A63F 13/79* (2014.01)
    *A63F 13/85* (2014.01)

(52) U.S. Cl.
    CPC .............. *A63F 13/79* (2014.09); *A63F 13/85* (2014.09); *A63F 2300/575* (2013.01)

(56) References Cited

OTHER PUBLICATIONS

English Translation of Written Opinion of the International Searching Authority and PCT/IB/338 for PCT/JP2015/075341 dated Apr. 13, 2017.
Trading Card Game Communication Tool "Duel Portal" Trade, [online],Sep. 17, 2015, published on May 20, 2011,URL:http://tocage.jp/trade_list.cgi.

* cited by examiner

FIG.17

TBL101

| CARD ID | NAME | CARD IMAGE | RARITY | DISTRIBUTED NUMBER | SPECIAL ABILITY | OFFENSIVE POWER | DEFENSIVE POWER | COST | SALE PRICE | APPEARANCE DATE AND TIME | ... |
|---|---|---|---|---|---|---|---|---|---|---|---|
| C1001 | Ca | C1001.jpg | LEGENDARILY RARE | 100 | aaa+ | 8000 | 5500 | 16 | 12850 | 2014.7.1 | ... |
| C1002 | Cb | C1002.jpg | RARE | 10000 | bbb+ | 2650 | 2250 | 10 | 1050 | 2014.7.2 | ... |
| C1003 | Cc | C1003.jpg | S RARE | 2000 | ddd | 2400 | 2050 | 10 | 3950 | 2014.7.2 | ... |
| ... | ... | ... | ... | ... | ... | ... | ... | ... | ... | ... | ... |
| C3001 | Cx | C3001.jpg | RARE | 11000 | aaa+ | 1000 | 500 | 22 | 100 | 2014.7.10 | ... |
| C3002 | Cy | C3002.jpg | S RARE | 2500 | bbb | 4000 | 3200 | 15 | 4000 | 2014.7.11 | ... |
| C3003 | Cz | C3003.jpg | S RARE | 1500 | aaa+ | 5000 | 3700 | 16 | 6000 | 2014.7.11 | ... |

FIG.18

| USER ID | USER NAME | WISH LIST |
|---------|-----------|-----------|
| U0001 | Ua | C3001<br>C3003 |
| U0002 | Ub | C1001 |
| | | |

TBL102

FIG.19

TBL103

| USER ID | CARD ID | SERIAL NUMBER | CARD LEVEL | SPECIAL ABILITY LEVEL | DATE AND TIME OF OBTAINMENT | SUBMIT FLAG |
|---------|---------|---------------|------------|-----------------------|------------------------------|-------------|
| U0001 | C1001 | 001 | 100 | 15 | 2014.7.1 | 1 |
| U0001 | C1002 | 5000 | 50 | 1 | 2014.7.2 | 0 |
| U0001 | C1003 | 1999 | 100 | 10 | 2014.7.2 | 1 |
| ⋮ | ⋮ | ⋮ | ⋮ | ⋮ | ⋮ | ⋮ |
| U0002 | C3001 | 9999 | 50 | 10 | 2014.7.10 | 1 |
| U0002 | C3002 | 2000 | 30 | 10 | 2014.7.11 | 1 |
| U0002 | C3003 | 501 | 20 | 1 | 2014.7.11 | 1 |

FIG.20

| EXCHANGE REQUEST ID | REQUESTING USER ID | REQUESTED USER ID | DESIRED CARD (CARD ID, SERIAL NO.) | OFFERED CARD (CARD ID, SERIAL NO.) | REQUEST RECEIVING DATE AND TIME | STATUS FLAG |
|---|---|---|---|---|---|---|
| T0001 | U0002 | U0001 | (C1001,001)<br>(C1003,1999) | (C3001,9999)<br>(C3003,501) | 2014.9.10 | 0 |
| T0002 | U0003 | U0001 | (C1002,5000) | (C3002,300) | 2014.9.10 | 0 |

TBL104

GAME SYSTEM, TRADE REQUEST ACCEPTANCE DEVICE, AND INFORMATION STORAGE MEDIUM

CROSS-REFERENCE TO RELATED APPLICATION

The present disclosure contains subject matter related to that disclosed in Japanese Patent Application JP2014-200746 filed in the Japan Patent Office on Sep. 30, 2014 and International Patent Application PCT/JP2015/075341 filed in the Japan Patent Office on Sep. 7, 2015, the entire contents of which are hereby incorporated by reference.

BACKGROUND OF THE INVENTION

1. Field of the Invention

The present invention relates to a game system, exchange request receiving device, and an information storage medium.

2. Description of the Related Art

Games are known which include exchange functions to exchange a game object associated with one piece of user identification information for a game object associated with another user identification information (see e.g., JP2014-000103A). In such games, for example, game objects such as a game card, a game character, and a game item are exchangeable.

For example, in the game described above, a user A submits a game object selected from his/her game objects to offer to other users. In a case where a user B requests the user A to exchange objects, the user B selects a game object (desired game object) that he/she wants to obtain from the game objects submitted by the user A, and also selects a game object to offer (offered game object) to the user A from his/her game objects. In this case, if the user A accepts to exchange the desired game object for the offered game object, such exchange is executed between the user A and the user B.

SUMMARY OF THE INVENTION

Conventionally, the games as mentioned above restrict game objects to be exchanged only in submitted units, thereby restricting freedom to exchange. This results in loss of opportunity for the users to exchange the game objects.

For example, when the user A submits n (n: an integer of 1 or more) number of game objects in one submission, an exchange is executed for n game objects as an exchange unit. That is, in this case, the user B needs to collectively select the n game objects submitted by the user A as desired objects, and also select n game objects from his/her game objects as offered game objects.

As such, for example, in a case where the user A submits a combination of two game objects X and Y in one submission, even though there exist a user B who wishes to obtain only the game object X and a user C who wishes to obtain only the game object Y, the user C cannot obtain only the game object X by an exchange with the user A, and also the user D cannot obtain only the game object Y by an exchange with the user A.

Further, for example, in a case where the user A submits the game objects X and Y in separate submissions, even though the user B wishes to exchange these two game objects X and Y for a game object Z (e.g., a game object having a higher value than each of the game objects X and Y, and an equal value to the combination of the game objects X and Y), the user B cannot exchange the game objects X and Y for the game object Z with the user A. Further, for example, even though the user B wishes to exchange the two game objects X and Y for three game objects P, Q, and R, the user B cannot exchange the game objects X and Y for the game objects P, Q, and R with the user A.

One or more embodiments of the present invention have been conceived in view of the above, and an object thereof is to provide a game system, an exchange request receiving device, and an information storage medium capable of reducing loss of opportunity for exchanging game objects by improving freedom of exchanging the game objects.

In order to solve the above described problems, a game system according to the present invention includes at least one processor configured to: receive, from a second user identified by second user identification information, an exchange request for exchanging a desired game object for an offered game object, the desired game object being selected from a first group of game objects associated with first user identification information of a first user, the offered game object being selected from a group of second game objects associated with the second user identification information; exchange the desired game object for the offered game object based on the exchange request; and receive a selection of any combination of game objects which comprise the desired game object and/or the offered game object, in an exchange.

An exchange request receiving device according to the present invention includes at least one processor configured to: receive, from a user identified by second user identification information, an exchange request comprising a desired game object for an offered game object, the desired game object being selected from a group of game objects associated with first user identification information, the offered game object being selected from a group of game objects associated with the second user identification information; and receive, from the user, a selection of any combination of game objects which comprise the desired game object and/or the offered game object, in an exchange.

BRIEF DESCRIPTION OF THE DRAWINGS

FIG. 17 is a diagram illustrating an example of a game object information table.

FIG. 18 is a diagram illustrating an example of a user information table.

FIG. 19 is a diagram illustrating an example of an owned game object information table.

FIG. 20 is a diagram illustrating an example of an exchange request information table.

DESCRIPTION OF THE EMBODIMENTS

Figure 1:
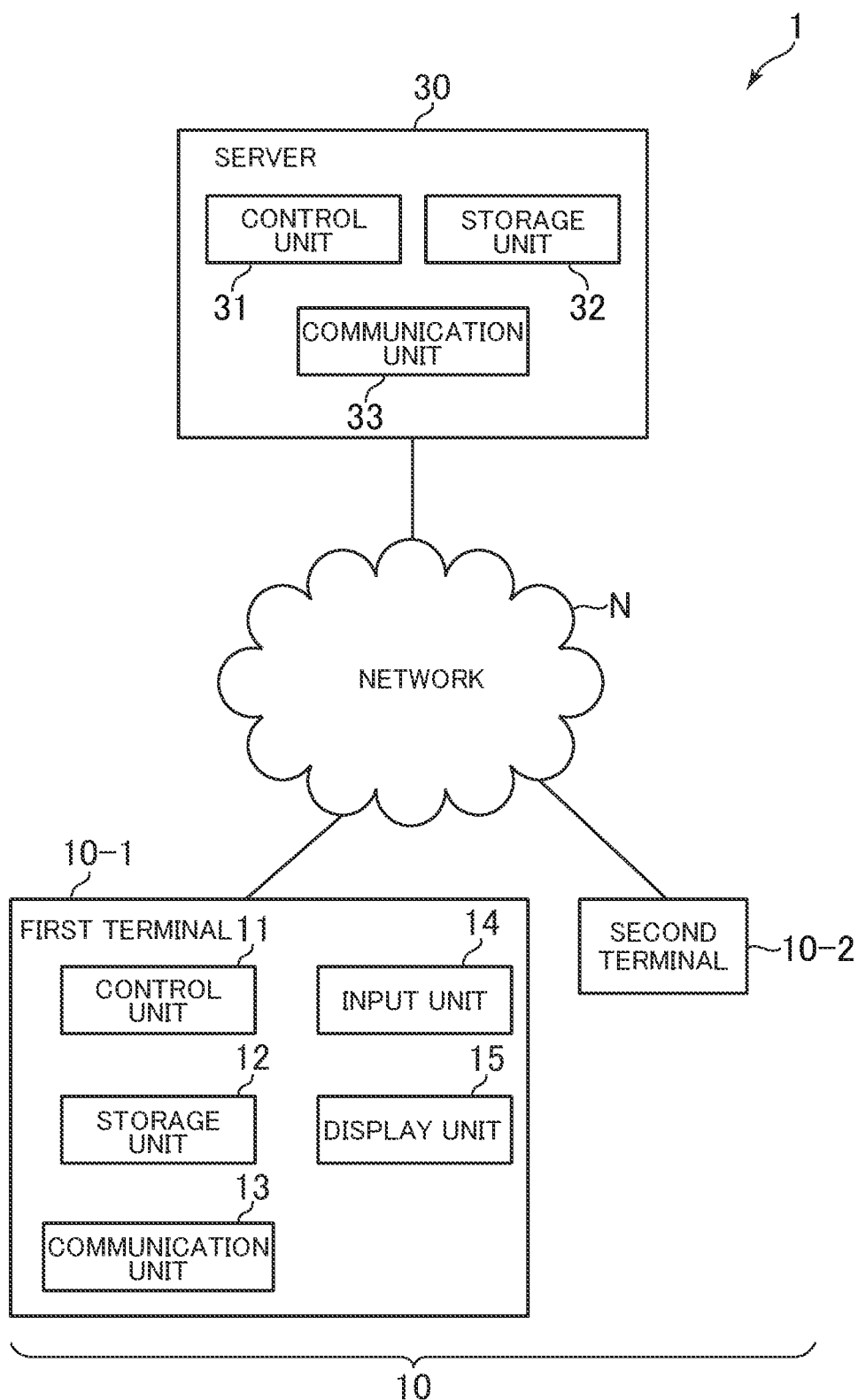
FIG. 1 is a diagram illustrating an overall configuration of a game system.

An embodiment of the present invention will be described below with reference to the accompanying drawings. In the drawings, elements that are the same or equivalent are labeled with the same numerals, and their overlapping explanation may be omitted.

[1. Overall Configuration of Game System]

FIG. 1 is a diagram illustrating an overall configuration of a game system 1 according to an embodiment of the present invention. As shown in FIG. 1, the game system 1 of the embodiment includes a server 30 (an example of the exchange request receiving device), a first terminal 10-1, and a second terminal 10-2. The server 30, the first terminal 10-1, and the second terminal 10-2 are connected to a network N. As such, data communication can be established among the server 30, the first terminal 10-1, and the second terminal 10-2. In the following, regarding the common description between the first terminal 10-1 and the second terminal 10-2, these terminals may be described as a terminal 10 for the sake of description.

The server 30 is implemented by, for example, a server computer. As shown in FIG. 1, the server 30 includes a control unit 31, a storage unit 32, and a communication unit 33.

The control unit 31 includes at least one microprocessor, for example, and executes processing according to an operating system or other programs. The storage unit 32 includes a main storage unit (e.g., RAM) and an auxiliary storage unit (e.g., hard disk drive or solid state drive), and stores programs and data. The communication unit 33 is a unit for data communications through the network N.

The terminal 10 is a computer used by a user. In this embodiment, the terminal 10 is a computer used by a user to play a game. The terminal 10 is implemented by, for example, a mobile phone (including smartphone), a mobile information terminal (including tablet computer), a home-use game machine (stationary game machine), a portable game machine, a commercial game machine, a desktop computer, and a laptop computer. In the following, a mobile phone (smartphone) with a touch panel is the terminal 10, and a case is explained in which a program supplied from the server 30 is executed on the mobile phone (smartphone).

As shown in FIG. 1, the terminal 10 includes a control unit 11, a storage unit 12, a communication unit 13, an input unit 14, and a display unit 15.

The control unit 11 and the communication unit 13 have the same functions as the control unit 31 and the communication unit 33 of the server 30. The storage unit 12 includes a main storage unit (e.g., RAM) and an auxiliary storage unit (e.g., non-volatile semiconductor memory), and stores programs and data. For example, in a case where the terminal 10 is implemented by a home-use game machine (stationary game machine), a commercial game machine, a desktop computer, or a laptop computer, the storage unit 12 may include a hard disk drive etc. as an auxiliary storage unit.

The input unit 14 includes, for example, a touch panel and a button, and is used for a user to perform an input operation such as a game operation. Further, the input unit 14 may be used by the user to perform an input operation by voice or gesture. In a case where the terminal 10 is implemented by a home-use game machine (stationary game machine), a portable game machine, a commercial game machine, a desktop computer, or a laptop computer, for example, the input unit 14 may include a key, a lever, a game controller (game pad), or a mouse. The display unit 15 is a liquid crystal display panel or an organic EL display, for example, and displays a screen according to a request from the control unit 11. The input unit 14 and the display unit 15 may not necessarily be installed in the terminal 10, but be provided as an external device connected to the terminal 10.

The program or data is provided to the server 30 or the terminal 10 via the network N, for example. The server 30 or the terminal 10 may include an element for reading a program or data stored in the information storage medium (e.g., optical disk or memory card). The program or the data may be supplied to the server 30 or the terminal 10 via the information storage medium.

[2. Outline of Game Executed in Game System 1]

The game system 1 displays a game screen on the display unit 15 of the terminal 10 based on data supplied from the server 30 upon request from the terminal 10, thereby executing a game.

The game system 1 is capable of executing various games. For example, the game system 1 executes a game in which user identification information is associated with a game object. Specifically, the game system 1 executes a game having exchange functions that enable to exchange a game object associated with one piece of user identification information for a game object associated with another user identification information.

Here, "user identification information" is information for a computer included in the game system 1 to uniquely identify a user. For example, a user ID, a user account, and an e-mail address of a user correspond to "user identification information." Additionally, a user's name can correspond to "user identification information."

"Game object" is an object that can be used in a game. For example, "game object" is an object that can be exchanged between users in a game. Further, for example, "game object" is given to a user in a game. Specifically, examples of "game object" include a game card, a game character, or a game item, for example.

For example, the game system 1 stores information related to game objects (e.g., identification information for identifying a game object, or information indicating performance of a game object) in association with user identification information. In this case, "a game object associated with user identification information" is a game object in which the information described above is stored in association with user identification information.

Further, "a game object associated with user identification information" is, in other words, a game object owned by a user who is identified by user identification information. In this regard, "a game object owned by a user" is a game object that the user can exclusively use, sell, assign, or exchange. In other words, "a game object owned by a user" is a game object that only the user is permitted to use, for example.

For example, the game system 1 provides a user with a game object, and executes a game in which the game object provided to the user is used. Specifically, for example, the game system 1 executes a game in which a user collects game cards (game characters), have an adventure using his/her game cards, and competes against game cards owned by other users.

The game executed in the game system 1 includes a function of exchanging game cards, and is capable of exchanging game cards between users in the game. In the following, referring to game screen images illustrated in FIGS. 2 to 14, such an exchange function will be discussed. The game screen image is displayed on the display unit 15 of the terminal 10 based on data sent from the server 30 to the terminal 10.

In an example of the game described below, a first user operates a first terminal 10-1, and a second user operates a second terminal 10-2. In FIGS. 2 to 14, the first user is described as "user Ua", and the second user is described as "user Ub."

In the game described below, the first user registers a game card to submit to an exchange transaction (trade). Here, the "game card to submit" is, for example, a game card that the first user permits to offer to another user in exchange for a game card to be obtained from such another user.

Subsequently, the second user selects a game card (desired card) that he/she wants to obtain from the game cards submitted by the first user, also selects a game card (offered card) that he/she wants to offer to the first user from his/her game cards in exchange for the desired card, and requests the first user to exchange the desired card for the offered card.

After the first user confirms the request for the exchange from the second user, if the first user accepts the request, the exchange is executed so that the desired card selected from the game cards of the first user is exchanged with the offered card selected from the game cards of the second user.

[2.1. Submission]

Referring to FIGS. 2 to 5, the proceeding will be explained in which mainly the first user (user Ua) registers a game card for an exchange transaction (trade).

Figure 2:
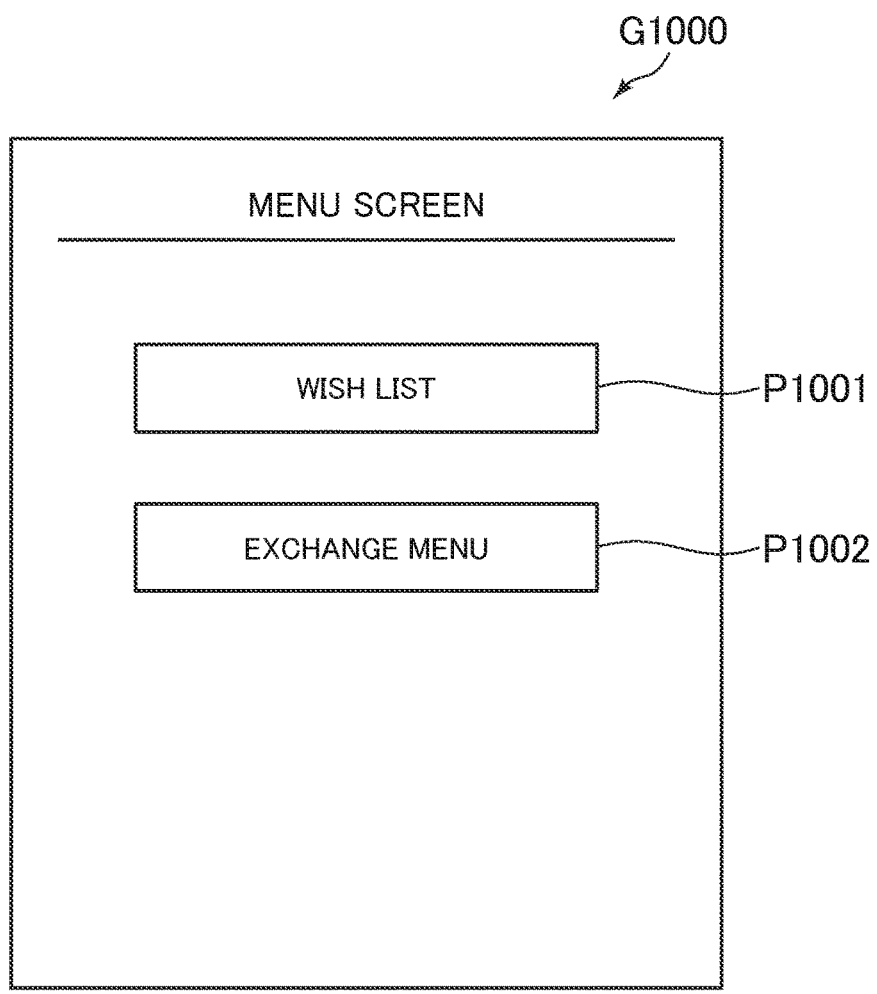
FIG. 2 is a diagram illustrating an example of a menu screen image.

FIG. 2 shows an example of a menu screen image G1000. The menu screen image G1000 shown in FIG. 2 is displayed on the display unit 15 of the first terminal 10-1. As shown in FIG. 2, the menu screen image G1000 includes a processing object P1001 and a processing object P1002.

Here, the "processing object" is, for example, an image, a symbol, or a text associated with the processing. For example, when the processing object P1001 is selected, the processing associated with the processing object P1001 is executed. Specifically, examples of "processing object" include an icon, a link, and a button.

The processing object P1001 is associated with the processing to proceed to edit a list of the cards associated with the user Ua. For example, the list may include a card that a user registers as a desired card, and a card that satisfies a specific condition. "Wish list" of a user is information indicating one or more game cards that the user wishes to obtain. Further, for example, "wish list" of a user is also information indicating one or more game cards that the user wishes to obtain from another user in exchange for one or more game cards to offer to such another user. Further, "card that satisfies a specific condition" may be, for example, a card having specific attribute information (e.g., specific special effect, special skill, classification, name), a card including a parameter (e.g, parameter indicating performance, scarcity, value of the card) being within a specific range, and a card belonging to a specific group. In the examples below, the processing object P1001 is associated with the processing for editing a list of cards included in "wish list" of the user.

The processing object P1002 is associated with the processing to proceed to the exchange menus. The exchange menus allow a user to proceed to the processing related to an exchange, such as registering a game card to submit, searching a user to exchange the game card and make a request, and confirming the exchange requested by another user.

Next, an example will be explained about a screen image that is displayed when a processing object P1001 of a menu screen image G1000 shown in FIG. 2 is selected.

Figure 3:
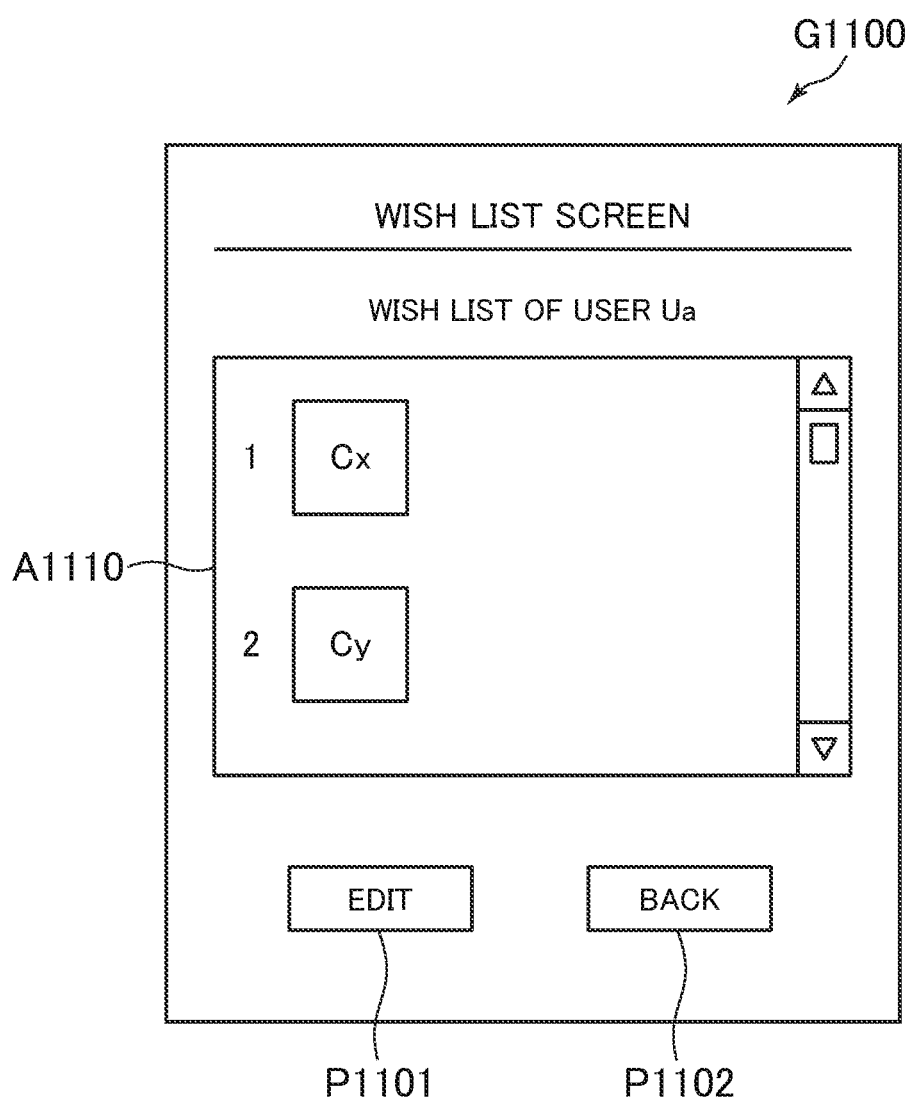
FIG. 3 is a diagram illustrating an example of a wish list screen image.

FIG. 3 shows an example of a wish list screen image G1100 displayed on the display unit 15 of the first terminal 10-1 when the processing object P1001 of the menu screen image G1000 is selected. As shown in FIG. 3, the wish list screen image G1100 includes a display area A1110 and processing objects P1101 and P1102.

The display area A1110 displays game cards registered in a "wish list" of the user Ua. The game cards registered in the wish list are, for example, game cards selected by the user Ua from a part or all of the game cards available in the game system 1. In the example shown in FIG. 3, the user Ua registers a game card Cx and a game card Cy in the wish list. In order to edit the wish list, the user Ua may select the processing object P1101 to select a desired game card from the list of game cards addible to the wish list, or to select a game card that the user Ua wants to eliminate from the wish list, thereby updating the wish list.

When the processing object P1102 is selected, the previous screen image (menu screen image G1000) of the wish list screen image G1100 is displayed on the display unit 15.

Next, an example will be explained about a screen image displayed when a processing object P1002 of the menu screen image G1000 shown in FIG. 2 is selected.

Figure 4:
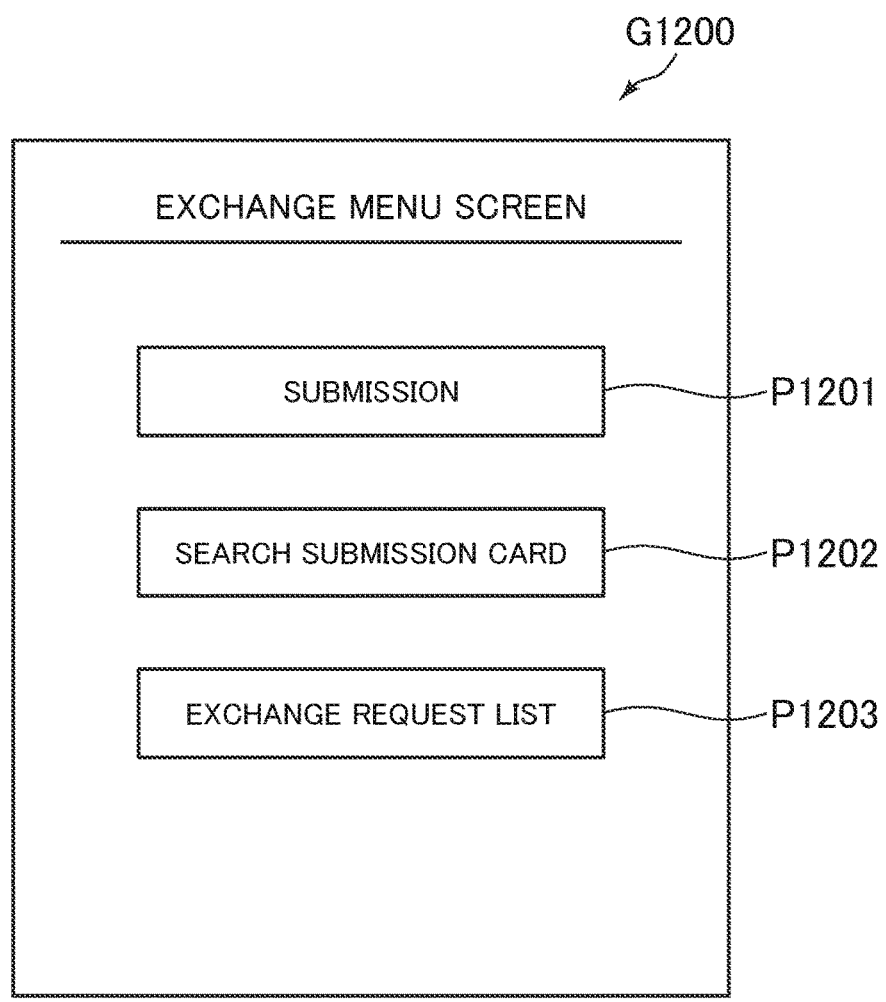
FIG. 4 is a diagram illustrating an example of an exchange menu screen image.

FIG. 4 shows an example an exchange menu screen image G1200 that is displayed on the display unit 15 of the first terminal 10-1 when the processing object P1002 of the menu screen image G1000 is selected. As shown in FIG. 4, the exchange menu screen image G1200 includes processing objects P1201, P1202, and P1203.

The processing object P1201 is associated with the processing for displaying a submission screen image that enables the user Ua to register a game card to submit from the game cards owned by the user Ua. The details of the submission screen image will be discussed later.

The processing object P1202 is associated with the processing for displaying a search screen image that enables the user Ua to search for game cards submitted by other users. The details of the search screen image will be discussed later.

The processing object P1203 is associated with the processing for displaying an exchange request list screen image showing a list of exchange requests that the user Ua has received from other users. The details of the exchange request list screen image will be discussed later.

Next, an example will be explained about a screen image displayed when the processing object P1201 of the exchange menu screen image G1200 shown in FIG. 4 is selected.

Figure 5:
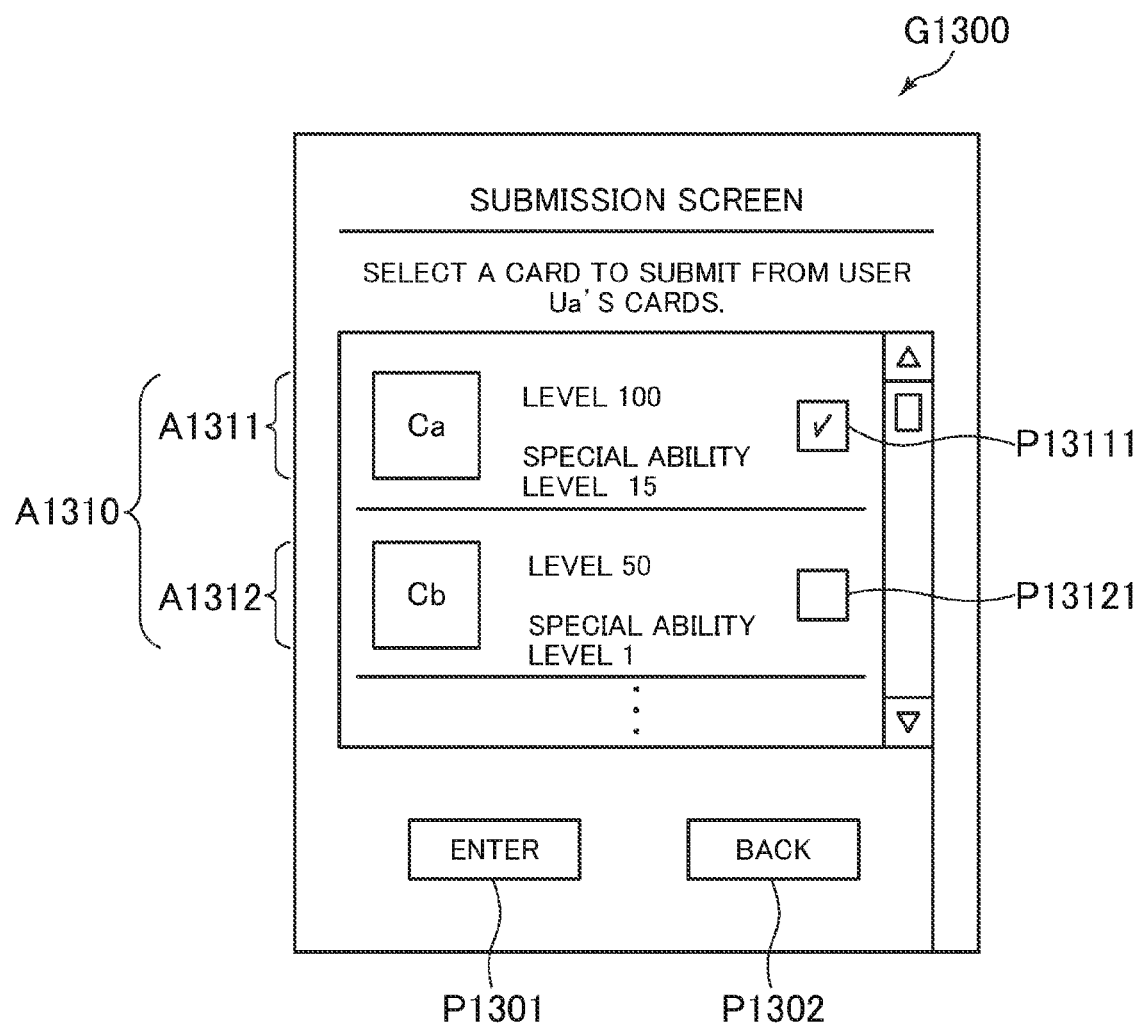
FIG. 5 is a diagram illustrating an example of a submission screen image.

FIG. 5 shows an example of a submission screen image G1300 displayed on the display unit 15 of the first terminal 10-1 when the processing object P1201 of the exchange menu screen image G1200 shown in FIG. 4 is selected. As shown in FIG. 5, the submission screen image G1300 includes a display area A1310 and processing objects P1301 and P1302.

The display area A1310 displays a list of game cards owned by the user Ua. FIG. 5 shows the submission screen image G1300 in a case where the user Ua has game cards Ca and Cb. As such, in the example of the submission screen image G1300 shown in FIG. 5, the display area A1310 includes a display area A1311 that displays information about the game card Ca and a display area A1312 that displays information about the game card Cb.

The display area A1311 includes a checkbox P13111 for selecting the game card Ca as a game card to submit (submission card). Similarly, the display area A1312 includes a checkbox P13121 for selecting the game card Cb as a submission card. In the example shown in FIG. 5, a game card can be selected as a submission card by checking a checkbox corresponding to the game card. Specifically, in the example shown in FIG. 5, the game card Ca is selected as a submission card, and the game card Cb is not selected as a submission card. When the processing object P1301 is selected, the game card with the checkbox being checked is registered in the server as a submission card of the user Ua.

When the processing object P1302 is selected, the previous screen image (exchange menu screen image G1200) of the submission screen image G1300 is displayed on the display unit 15.

In a case where multiple game cards are registered as submission cards of a user, the game cards may not necessarily be registered at the same time. That is, when multiple game cards are registered as submission cards of a user, the user may register one or more game cards as submission cards in plural times. In other words, after the user registers one or more game cards as submission cards, the user may further register one or more game cards as submission cards.

[2.2. Exchange Request]

Next, referring to FIGS. 6 to 10, the proceeding will be explained in which mainly the second user (user Ub) requests the first user (user Ua) for an exchange. The menu screen image G1000 shown in FIG. 2 and the exchange menu screen image G1200 shown in FIG. 4 are also displayed on the second terminal 10-2 similarly to the first terminal 10-1. In the following, an example will be explained about a screen image displayed when the processing object P1202 is selected while the exchange menu screen image G1200 shown in FIG. 4 is displayed on the display unit 15 of the second terminal 10-2.

Figure 6:
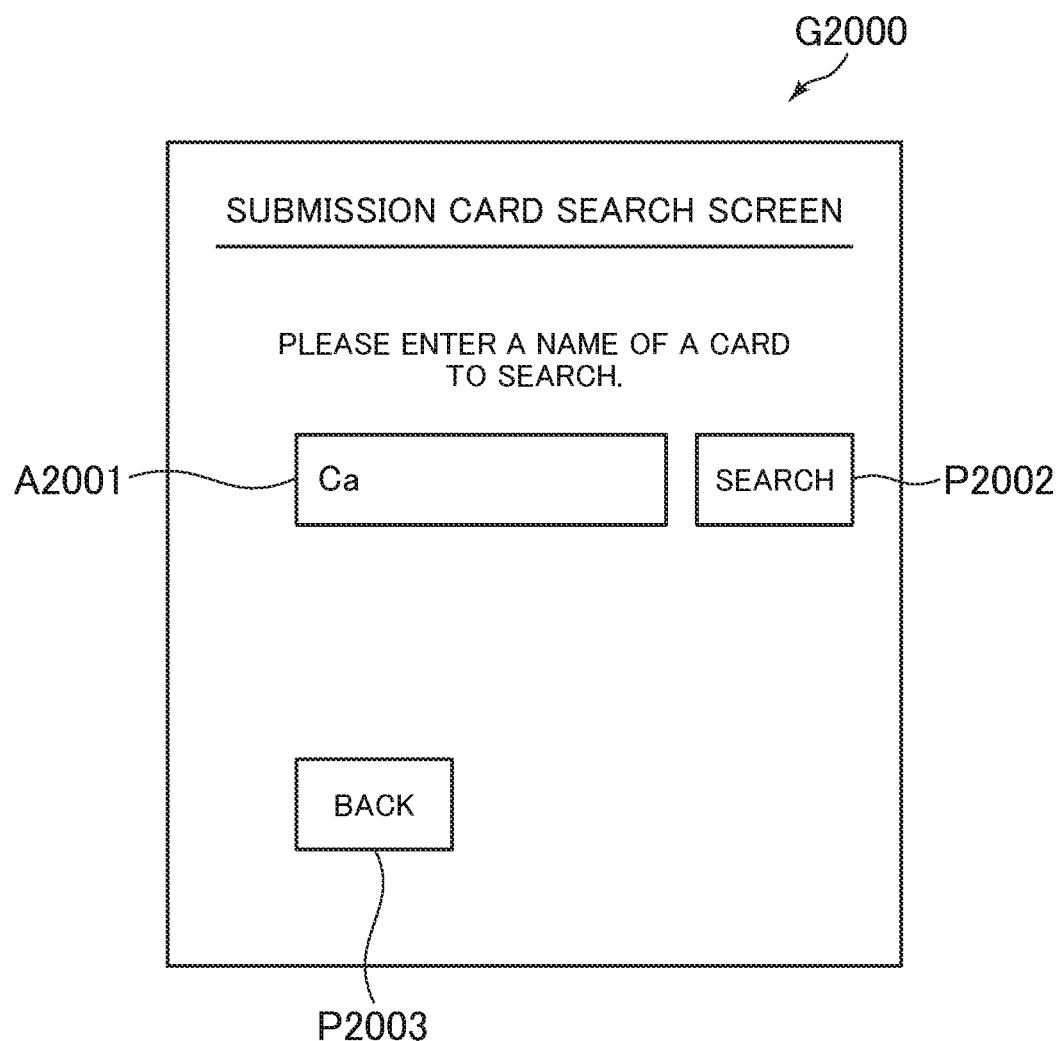
FIG. 6 is a diagram illustrating an example of a submission card search screen image.

FIG. 6 shows an example of a submission card search screen image G2000 displayed on the display unit 15 of the second terminal 10-2 when the processing object P1202 of the exchange menu screen image G1200 shown in FIG. 4 selected. As shown in FIG. 6, the submission card search screen image G2000 includes a search condition input area A2001 and processing objects P2002 and P2003.

The search condition input area A2001 is an area for entering a condition (e.g., a name of a game card) of a game card that the user wants to search among the game cards registered as submission cards in the server 30. When the processing object P2002 is selected while a text is entered in the search condition input area A2001, the second terminal 10-2 requests the server 30 to search, for example, a submission card that includes the text entered in the search condition input area A2001 in the name of the game card.

When the processing object P2003 is selected, the previous screen image (exchange menu screen image G1200) of the submission card search screen image G2000 is displayed on the display unit 15.

Next, an example will be explained about a screen image displayed when the processing object P2002 of the submission card search screen image G2000 shown in FIG. 6 is selected.

Figure 7:
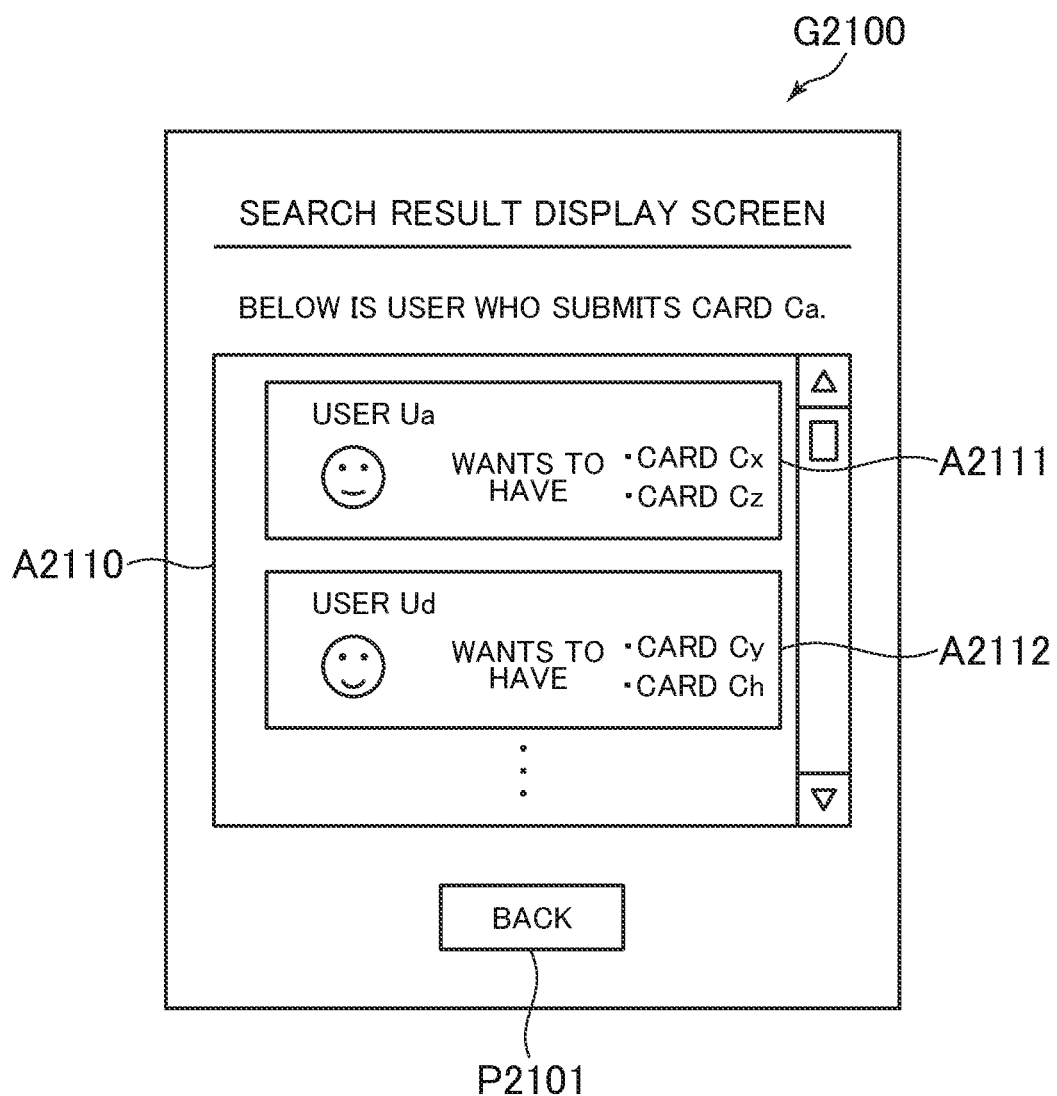
FIG. 7 is a diagram illustrating an example of a search result display screen image.

FIG. 7 shows an example of a search result display screen image G2100 displayed on the display unit 15 of the second terminal 10-2 when the processing object P2002 of the submission card search screen image G2000 shown in FIG. 6 is selected. As shown in FIG. 7, the search result display screen image G2100 includes a display area A2110 and a processing object P2101. When the processing object P2101 is selected, the previous screen image is displayed on the display unit 15.

The display area A2110 is an area for displaying a list of users who submit game cards that satisfy the search condition set in the submission card search screen image G2000 shown in FIG. 6. In the example shown in FIG. 7, the display area A2110 indicates that the user Ua displayed in the display area A2111 and the user Ud displayed in the display area A2112 are searched as users who submit a game card having a name "Ca."

Here, the display area A2111 displays information about game cards that the user Ua registers in the wish list. Similarly, the display area A2112 displays information about game cards that the user Ud registers in the wish list. For example, if the users displayed in the search result include a user who registers, in his/her wish list, a game card of the user Ub who has conducted the search, an exchange is highly likely effected by requesting such a user for the exchange. For example, the user Ub selects the display area A2111, thereby selecting the user Ua as a target to request for an exchange. This case will be discussed below.

Figure 8:
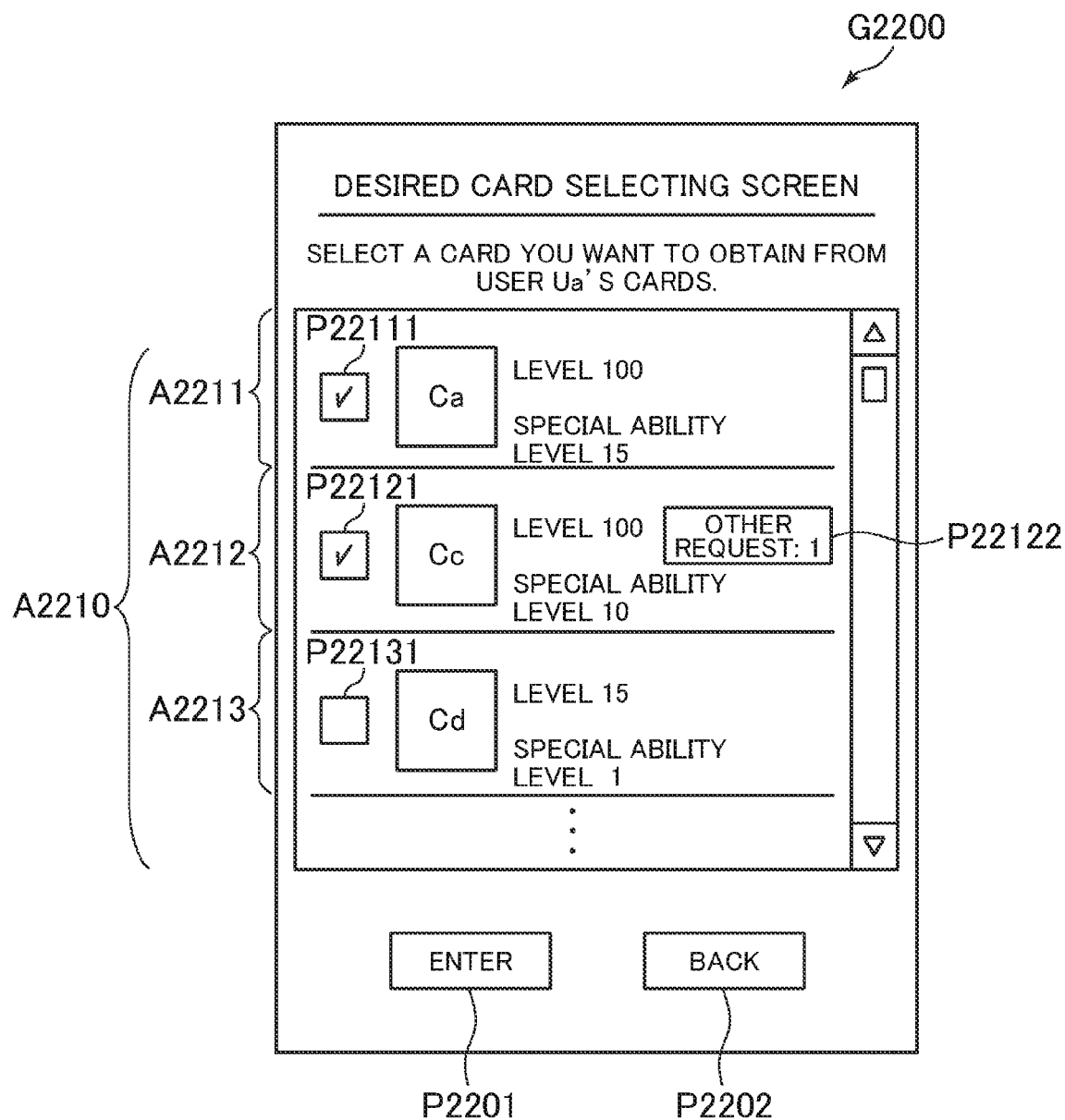
FIG. 8 is a diagram illustrating an example of a desired card selecting screen image.

FIG. 8 shows an example of a desired card selecting screen image G2200 displayed on the display unit 15 of the second terminal 10-2 when the display area A2111 of the search result display screen image G2100 shown in FIG. 7 is selected. The desired card selecting screen image G2200 is a screen image for the user Ub to select a game card that the user Ub wants to obtain from the submission cards registered by the user Ua to whom the exchange is requested.

As shown in FIG. 8, the desired card selecting screen image G2200 includes a display area A2210 and processing objects P2201 and P2202. When the processing object P2202 is selected, the previous screen is displayed on the display unit 15.

The display area A2210 is an area for displaying a list of submission cards of the user Ua. The display area A2210 includes information about the respective submission cards of the user Ua and checkboxes for whether to select each submission card as a desired card. FIG. 8 indicates the desired card selecting screen image G2200 in a case where the user Ua submits game cards Ca, Cc, and Cd. As such, in the example shown in FIG. 8, the display area A2210 includes a display area A2211 for displaying information about the game card Ca, a display area A2212 for displaying information about the game card Cc, and a display area A2213 for displaying information about the game card Cd.

Here, the user Ub checks the checkbox P22111 in the display area A2211, thereby selecting the game card Ca as a desired card. Similarly, the user Ub checks the checkbox P22121 in the display area A2212, thereby selecting the game card Cc as a desired card, and checks the checkbox P22131 in the display area A2213, thereby selecting the game card Cd as a desired card. In this way, the user Ub can select any one or more game cards from the game cards submitted by the user Ua as a desired card that the user Ub wants to obtain from the user Ua by exchange.

In a case where an exchange is already requested for the submission card, such information is displayed. FIG. 8 shows a case where a request for exchange is already made to the game card Cc. As such, in the example shown in FIG. 8, the display area A2212 displays a processing object P22122 that indicates an exchange request is already made for the game card Cc. Here, when the processing object P22122 is selected, content of the exchange request made for the game card Cc is displayed.

In the desired card selecting screen image G2200, when the user Ub selects the processing object P2201 while any one or more game cards are selected from the submission cards of the user Ua (i.e., while a checkbox of a game card to select is checked), the selection of the desired card is thereby determined.

Figure 9:
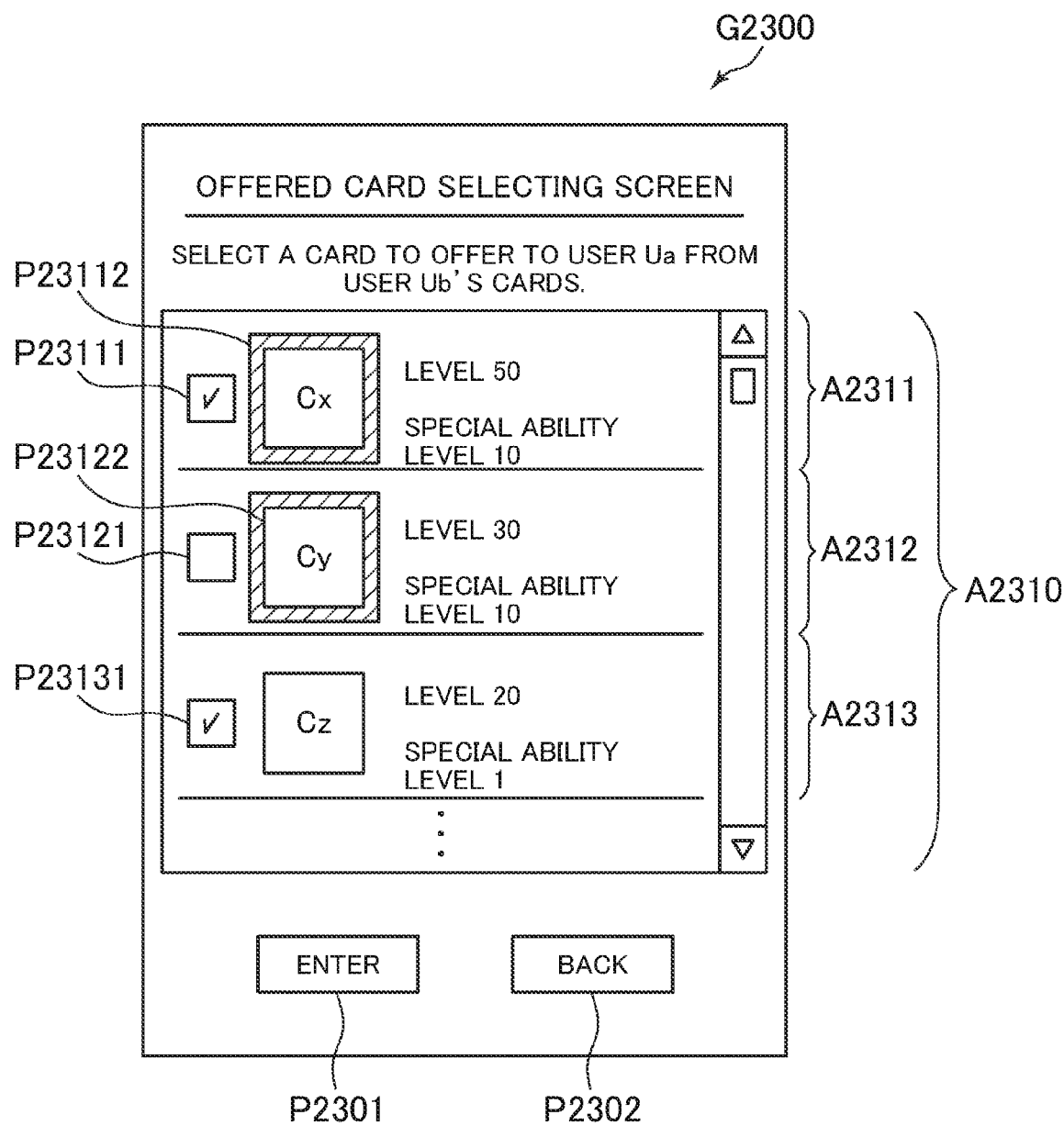
FIG. 9 is a diagram illustrating an example of an offered card selecting screen image.

Next, FIG. 9 shows an example of an offered card selecting screen image G2300 displayed on the display unit 15 of the second terminal 10-2 when the processing object P2201 of the desired card selecting screen image G2200 shown in FIG. 8 is selected. The offered card selecting screen image G2300 is a screen image for the user Ub to select, from the game cards of the user Ub, a game card (offered card) that the user Ub wants to offer to the user Ua, to whom the exchange request is made, in exchange for the desired card selected in the desired card selecting screen image G2200.

As shown in FIG. 9, the offered card selecting screen image G2300 includes a display area A2310 and processing objects P2301 and P2302. When the processing object P2302 is selected, the previous screen image is displayed on the display unit 15.

The display area A2310 is an area for displaying a list of game cards owned by the user Ub. The display area A2310 includes information about respective cards owned by the user Ub and a checkbox on each of the owned cards for whether to select as an offered card. FIG. 9 shows a case where the user Ub has game cards Cx, Cy, and Cz. As such, in the example shown in FIG. 9, the display area A2310 includes a display area A2311 that displays information about the game card Cx, a display area A2312 that displays information about the game card Cy, and a display area A2313 that displays information about the game card Cz.

Here, the user Ub checks the checkbox P23111 in the display area A2311, thereby selecting the game card Cx as an offered card. Similarly, the user Ub checks the checkbox P23121 in the display area A2312, thereby selecting the game card Cy as an offered card, and checks the checkbox P23131 in the display area A2313, thereby selecting the game card Cz as an offered card. In this way, the user Ub can select any one or more game cards from the game cards of the user Ub as an offered card in exchange for a desired card.

Here, regarding the game cards owned by the user Ub, the display area A2310 may display a game card registered in the wish list of the user Ua, to whom the exchange request is made, separately from a game card that is not registered in the wish list of the user Ua. For example, as shown in FIG. 9, when the game cards Cx and Cy are registered in the wish list of the user Ua, a frame image P23112 and a frame image P23122 respectively surrounding the game card Cx and the game card Cy are displayed. On the other hand, the game card Cz is not registered in the wish list of the user Ua, and thus a frame image is not displayed. For example, regarding the game cards owned by the user Ub, the display area A2310 may display a game card registered in the wish list of the user Ua, to whom the exchange request is made, in preference to a game card that is not registered in the wish list of the user Ua. Specifically, regarding the game cards owned by the user Ub, the display area A2310 may display a game card registered in the wish list of the user Ua, to whom the exchange request is made, in a display order higher than a game card that is not registered in the wish list of the user Ua.

In the offered card selecting screen image G2300, when the user Ub selects the processing object P2301 while any one or more game cards are selected from the cards owned by the user Ub (i.e., while a checkbox of a game card to select is checked), the selection of the offered card is thereby determined.

Figure 10:
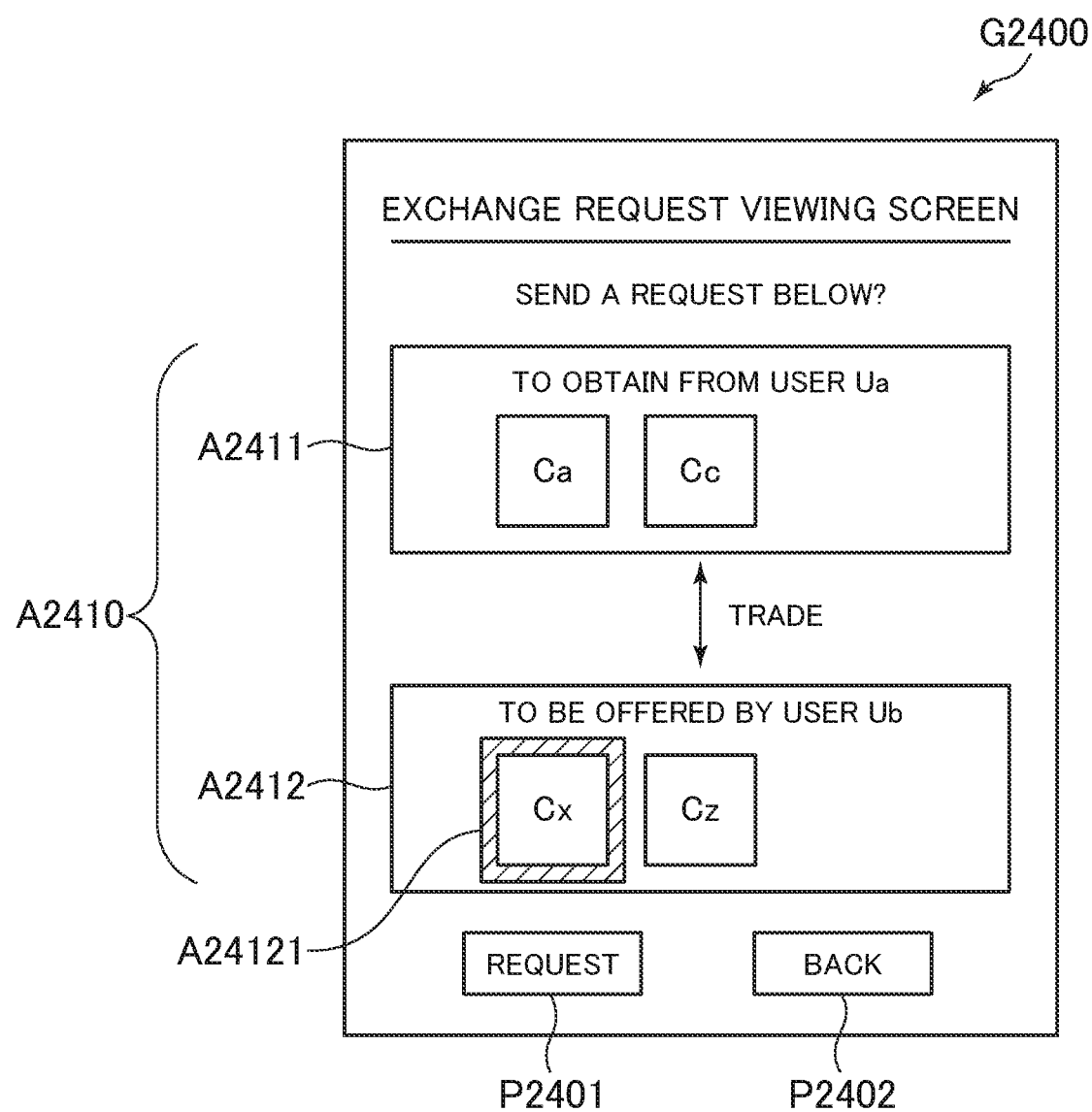
FIG. 10 is a diagram illustrating an example of an exchange request viewing screen image.

Next, FIG. 10 shows an example of an exchange request viewing screen image G2400 displayed on the display unit 15 of the second terminal 10-2 when the processing object P2301 of the offered card selecting screen image G2300 shown in FIG. 9 is selected. The exchange request viewing screen image G2400 is a screen image for the user Ub to view content of an exchange request to the user Ua.

The exchange request viewing screen image G2400 shown in FIG. 10 includes a display area A2410, and processing objects P2401 and P2402. When the processing object P2402 is selected, the previous screen image is displayed on the display unit 15.

The display area A2410 includes a display area A2411 that indicates information about the desired card selected in the desired card selecting screen image G2200, and a display area A2412 that indicates information about the offered card selected in the offered card selecting screen image G2300. In the display area A2412, a frame image P24121 is displayed for the game card Cx registered in the wish list of the user Ua.

When the processing object P2401 is selected, an exchange request to the user Ua with the content displayed on the display area A2410 is received in the exchange request viewing screen image G2400.

The aforementioned is an example of the proceeding of the exchange request of the user. In the game system 1, a user can make multiple exchange requests for the same submission card. For example, in the game system 1, the user Ub may be allowed to make a first exchange request in which the game cards Ca and Cc of the user Ua are set as the desired cards, and the game cards Cx and Cz of the user Ub are set as the offered cards, and additionally to make a second exchange request in which the game card Ca of the user Ua is set as the desired card, and the game card Cx of the user Ub is set as the offered card.

[2.3. Viewing and Accepting Exchange Request]

Next, referring to FIGS. 11 to 14, the procedure of viewing and accepting an exchange request mainly to the first user (user Ua) will be discussed. In the following, an example will be explained about a screen image displayed when the processing object P1203 is selected while the exchange menu screen image G1200 shown in FIG. 4 is displayed on the display unit 15 of the first terminal 10-1.

Figure 11:
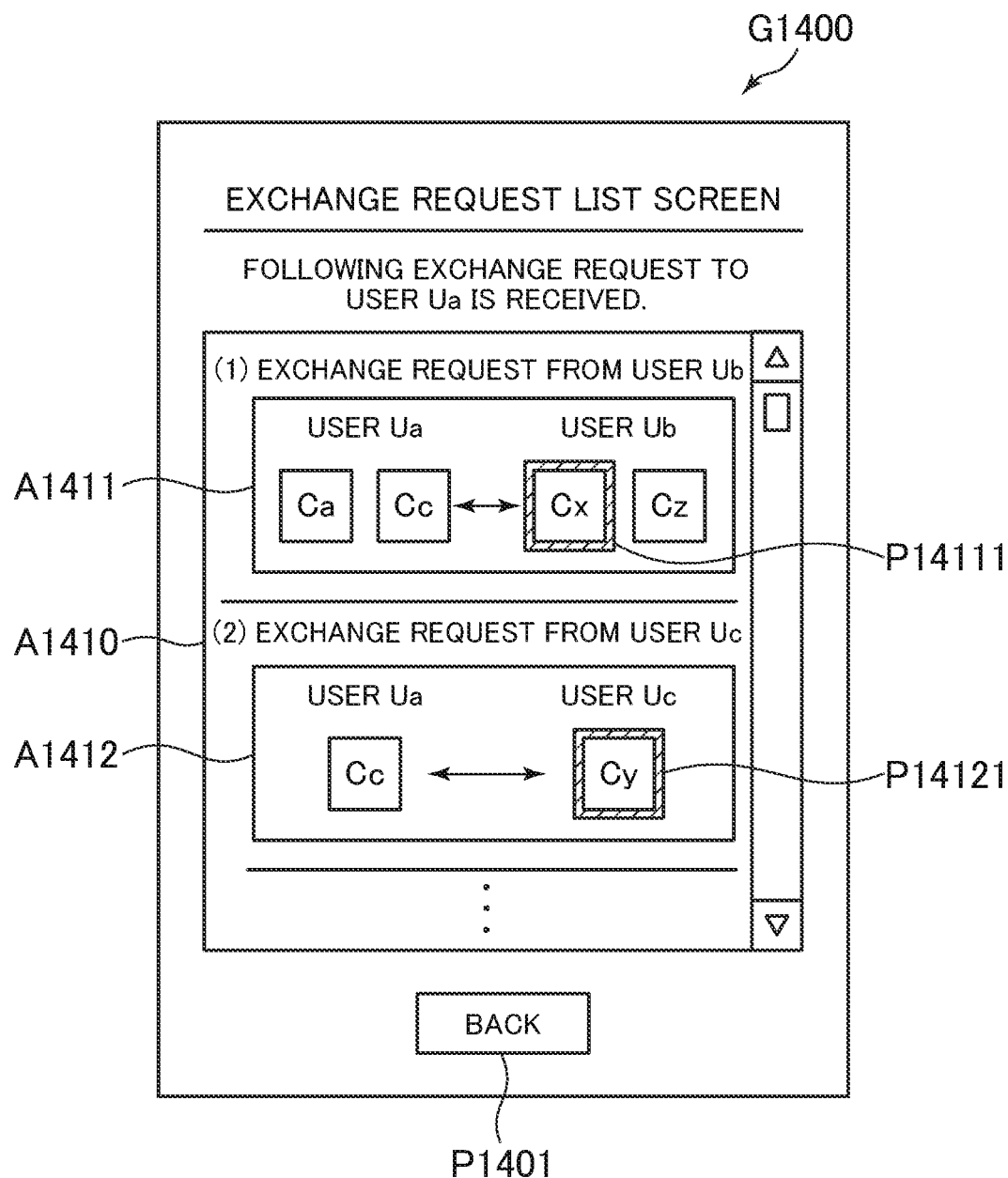
FIG. 11 is a diagram illustrating an example of an exchange request list screen image.

FIG. 11 shows an example of an exchange request list screen image G1400 that is displayed when the processing object P1203 of the exchange menu screen image G1200 is selected. As shown in FIG. 11, the exchange request list screen image G1400 includes a display area A1410 and a processing object P1401. When the processing object P1401 is selected, the previous screen image is displayed on the display unit 15.

The display area A1410 displays a list of exchange requests to the user Ua. The display area A1410 includes display areas A1411 and A1412 for respectively displaying exchange requests.

FIG. 11 shows a case where the users Ub and Uc make exchange requests to the user Ua. As such, the display area A1411 displays information about the exchange request from the user Ub, and the display area A1412 displays information about the exchange request from the user Uc. Here, regarding the game cards for which the user Ua receives exchange requests from other users, the display area A1410 may display a game card registered in the wish list of the user Ua separately from a game card that is not registered in the wish list of the user Ua. For example, as shown in FIG. 11, when the game cards Cx and Cy are registered in the wish list of the user Ua, a frame image P14111 and a frame image P14121 respectively surrounding the game cards Cx and Cy are displayed. On the other hand, the game card Cz is not registered in the wish list of the user Ua, and thus a frame image is not displayed.

Specifically, regarding the information about the exchange requests, the display area A1410 may display information about an exchange request including a game card registered in the wish list of the user Ua, to whom the exchange request is made, in a display order higher than information about an exchange request including a game card that is not registered in the wish list of the user Ua. For example, the display area A1410 may display information about the exchange requests in an ascending order or a descending order of the dates and times on which the exchange request are received.

In the exchange request list screen image G1400 shown in FIG. 11, when one of the exchange requests displayed on the display area A1410 is selected, a screen image (exchange request accepting screen image G1500) for determining whether to accept the selected exchange request is displayed.

Figure 12:
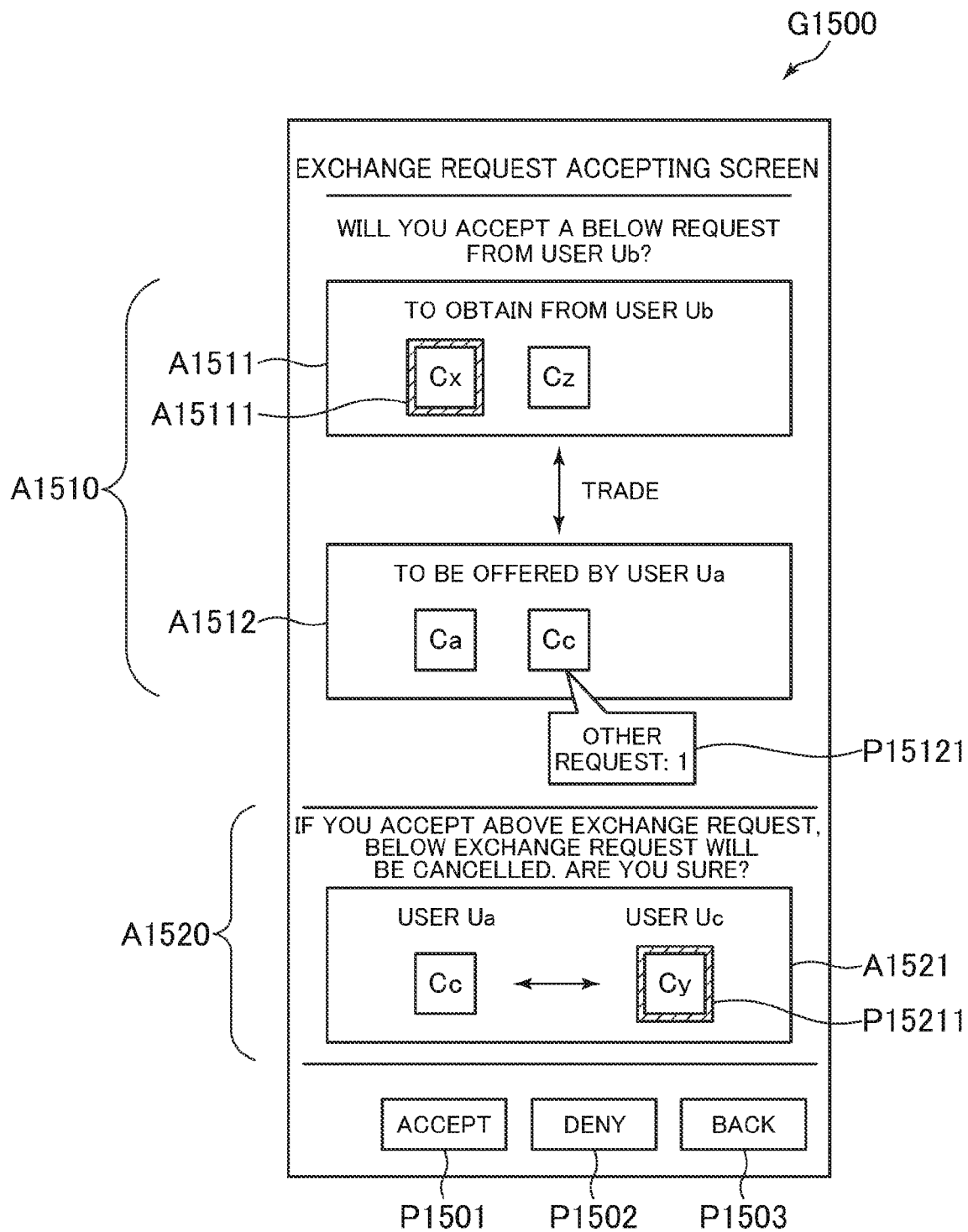
FIG. 12 is a diagram illustrating an example of an exchange request accepting screen image.

FIG. 12 shows an example of an exchange request accepting screen image G1500. The exchange request accepting screen image G1500 shown in FIG. 12 is a screen image displayed on the display unit 15 of the first terminal 10-1 when the user Ua selects the display area A1411 in the exchange request list screen image G1400 shown in FIG. 11.

As shown in FIG. 12, the exchange request accepting screen image G1500 includes display areas A1510 and A1520 and processing objects P1501, P1502, and P1503. When the processing object P1503 is selected, the previous screen image is displayed on the display unit 15.

The display area A1510 is an area for displaying information about an exchange request for which whether to accept is determined. The display area A1510 includes a display area A1511 for displaying information about a game card to be obtained from the user Ub who is a partner of the user Ua for the exchange, and a display area A1512 for displaying information about a game card to be offered from the user Ua to the user Ub.

Here, if another exchange request is received for the game card that the user Ua wishes to offer by exchange, such information is displayed. In the example of the exchange request accepting screen image G1500 shown in FIG. 12, the game cards to be offered from the user Ua by exchange are game cards Ca and Cc. Among these cards, the user Ua has received another exchange request for the game card Cc, and thus a processing object P15121 indicating that the game card Cc is received another exchange request is displayed.

Here, in the exchange request accepting screen image G1500 shown in FIG. 12, an example will be explained about a screen image displayed when the user Ua selects the processing object P15121 associated with the game card Cc.

Figure 13:
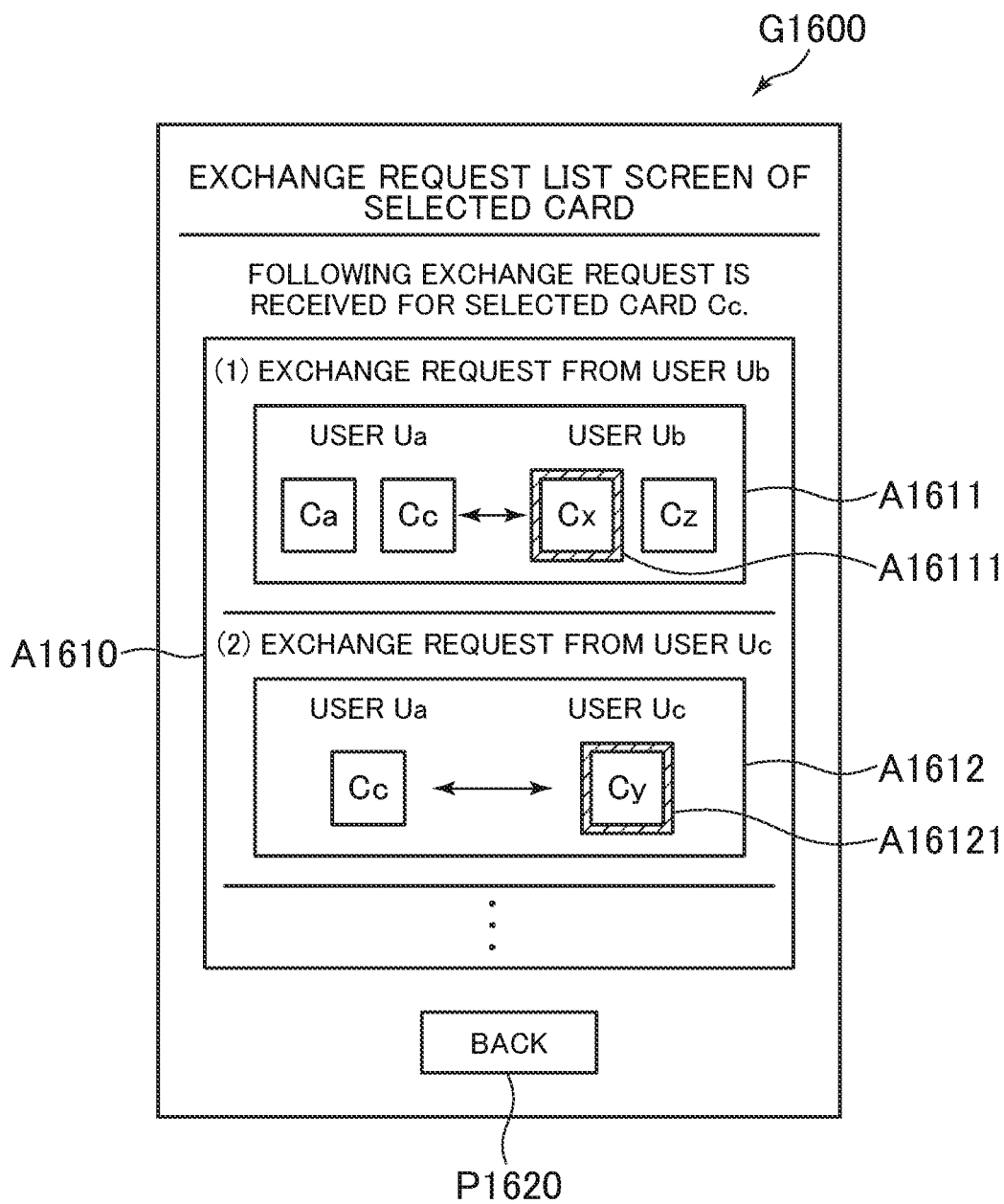
FIG. 13 is a diagram illustrating an example of an exchange request list screen image of a selected card.

FIG. 13 shows an example of an exchange request list screen image G1600 of the selected card displayed when the user Ua selects the processing object P15121 in the exchange request accepting screen image G1500 shown in FIG. 12. In this example, the "selected card" is the game card Cc.

As shown in FIG. 13, the exchange request list screen image G1600 of the selected card includes a display area A1610 and a processing object P1601.

The display area A1610 is an area displaying information about an exchange request to the user Ua where the selected card is included in the desired cards. In the example shown in FIG. 13, the display area A1610 displays information about two exchange requests. A display area A1611 displays information about the first exchange request (information about the exchange request between the user Ua's game cards Ca and Cc and the user Ub's game cards Cx and Cz), and a display area A1612 displays information about the second exchange request (information about the exchange request between the user Ua's game card Cc and the user Uc's game card Cy). In the display area A1611 and the display area A1612, frame images P16111 and P16121 are displayed respectively for the game cards Cx and Cy that are registered in the wish list of the user Ua.

In the exchange request list screen image G1600 shown in FIG. 13, when the processing object P1601 is selected, the exchange request accepting screen image G1500 shown in FIG. 12 is displayed on the display unit 15. Here, assume a case where the processing returns to the exchange request accepting screen image G1500 shown in FIG. 12.

The display area A1520 of the exchange request accepting screen image G1500 shown in FIG. 12 displays information about an exchange request that would be cancelled when the exchange request to be determined its acceptance among the exchange requests made to the user Ua is accepted. In the example of the exchange request accepting screen image G1500 shown in FIG. 12, when the game cards Cx and Cz of the user Ub are exchanged with the game cards Ca and Cc of the user Ua, an exchange between the game card Cy of the user Uc and the game card Cc of the user Ua is impossible. Thus, information about such an exchange request is displayed on the display area A1521.

In order to accept the exchange request displayed in the display area A1510, the user Ua selects a processing object P1501. When the Ua does not accept (denies) the exchange request displayed in the display area A1510, the user Ua selects a processing object P1502. When the processing object P1502 is selected, the exchange request displayed in the display area A1510 is updated from an acceptance waiting status to a denial status, and the user Ub, who is a sender of the exchange request, is notified that the exchange request is denied by the user Ua. Further, when the exchange request is in the denial status, for example, the display area A1410 of the exchange request list screen image G1400 shown in FIG. 11 no longer displays information about the exchange request in the denial status.

When the processing object P1501 is selected in the exchange request accepting screen image G1500 shown in FIG. 12 and the exchange request displayed in the display area A1510 is accepted, the exchange of the game cards based on the accepted exchange request is executed. When the exchange of the game cards is executed, the display unit 15 of the first terminal 10-1 displays an exchange complete screen image G1700 shown in FIG. 14.

Figure 14:
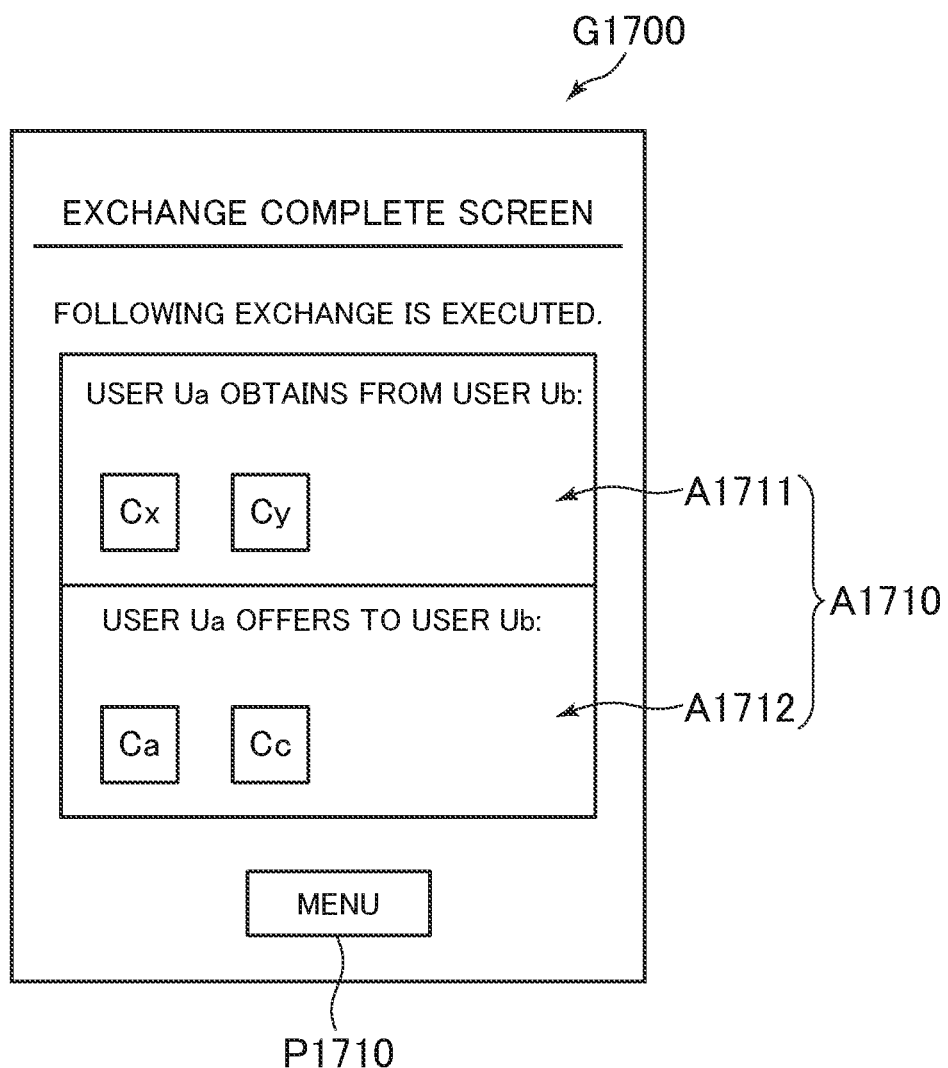
FIG. 14 is a diagram illustrating an example of an exchange complete screen image.

As shown in FIG. 14, the exchange complete screen image G1700 includes a display area A1710 for displaying content of the completed exchange, and a processing object P1701 for returning to the menu screen image G1000 shown in FIG. 2.

As shown in FIG. 14, the display area A1710 includes a display area A1711 for displaying the game card that the user Ua, who has accepted the exchange request, obtains from the user Ub, who is the sender of the exchange request, and a display area A1712 for displaying the game card offered by the user Ua, who has accepted the exchange request, to the user Ub, who is the sender of the exchange request.

In the example above, the case is described in which, when the user selects a game card as a submission card, the user directly selects the game card, although a method of selecting the game card is not limited to this. For example, the user may specify a condition to be satisfied by the game card that is selected as the submission card, and select the game card that satisfies the specified condition as the submission card. For example, as the "condition to be satisfied by the game card", the user may specify a card having specific attribute information (e.g., specific special effect, special skill, classification, names), a card including a parameter (e.g, parameter indicating performance, scarcity, value of the card) being within a specific range, and a card belonging to a specific group. Similarly, when the user selects a desired card and an offered card, the user may select game cards respectively as the desired card and the offered card by specifying a condition satisfied by the game card selected as the desired card and a condition satisfied by the game card selected as the offered card.

The aforementioned is an example of the exchange of game cards executed in the game system 1. Here, based on FIG. 15, characteristics of the exchange of game cards described above will be discussed.

Figure 15:
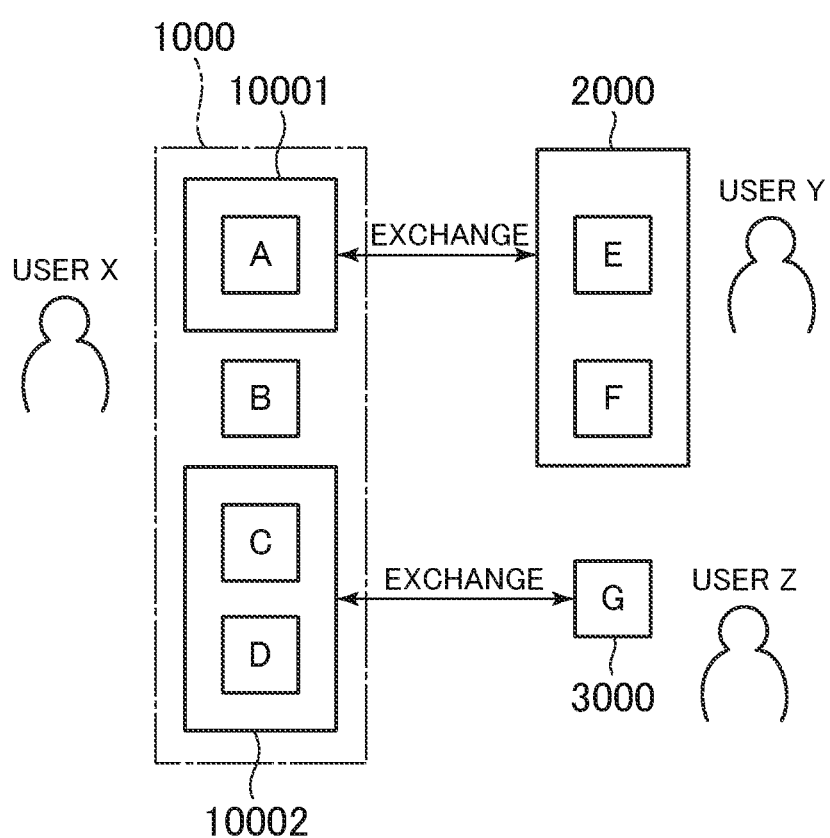
FIG. 15 is a diagram illustrating an example of exchanges established between users.

In the example shown in FIG. 15, assume a case where a user X wants to submit game cards A, B, C, and D to exchange with other users, a user Y wants to obtain the game card A, and a user Z wants to obtain the game cards C and D.

In this case, the user X registers the game cards A, B, C, and D as submission cards 1000 in the game system 1. The user Y can select any combination of game cards from the submission cards 1000 as desired cards 10001 to be obtained from the user X, and also select any combination of game cards from his/her game cards as offered cards 2000 to be offered to the user X. In other words, the user Y can select the game card A from the submission cards 1000 as the desired card 10001, and the game cards E and F as the offered cards 2000, and request the user X for an exchange. Similarly, the user Z can select any combination of game cards from the submission cards 1000 as desired cards 10002 to be obtained from the user X, and also select any combination of game cards from his/her game cards as offered cards 3000 to be offered to the user X. In other words, the user Z can select game cards C and D from the submission cards 1000 as the desired cards 10002, the game card G as the offered card 3000 to be offered to the user X, and request the user X for an exchange. As described, freedom of selecting game cards to be exchanged between users is improved in the game system 1.

[3. Functions Implemented in Game System 1]

Next, the configuration provided to the game system 1 to implement the functions mentioned above will be discussed.

Figure 16:
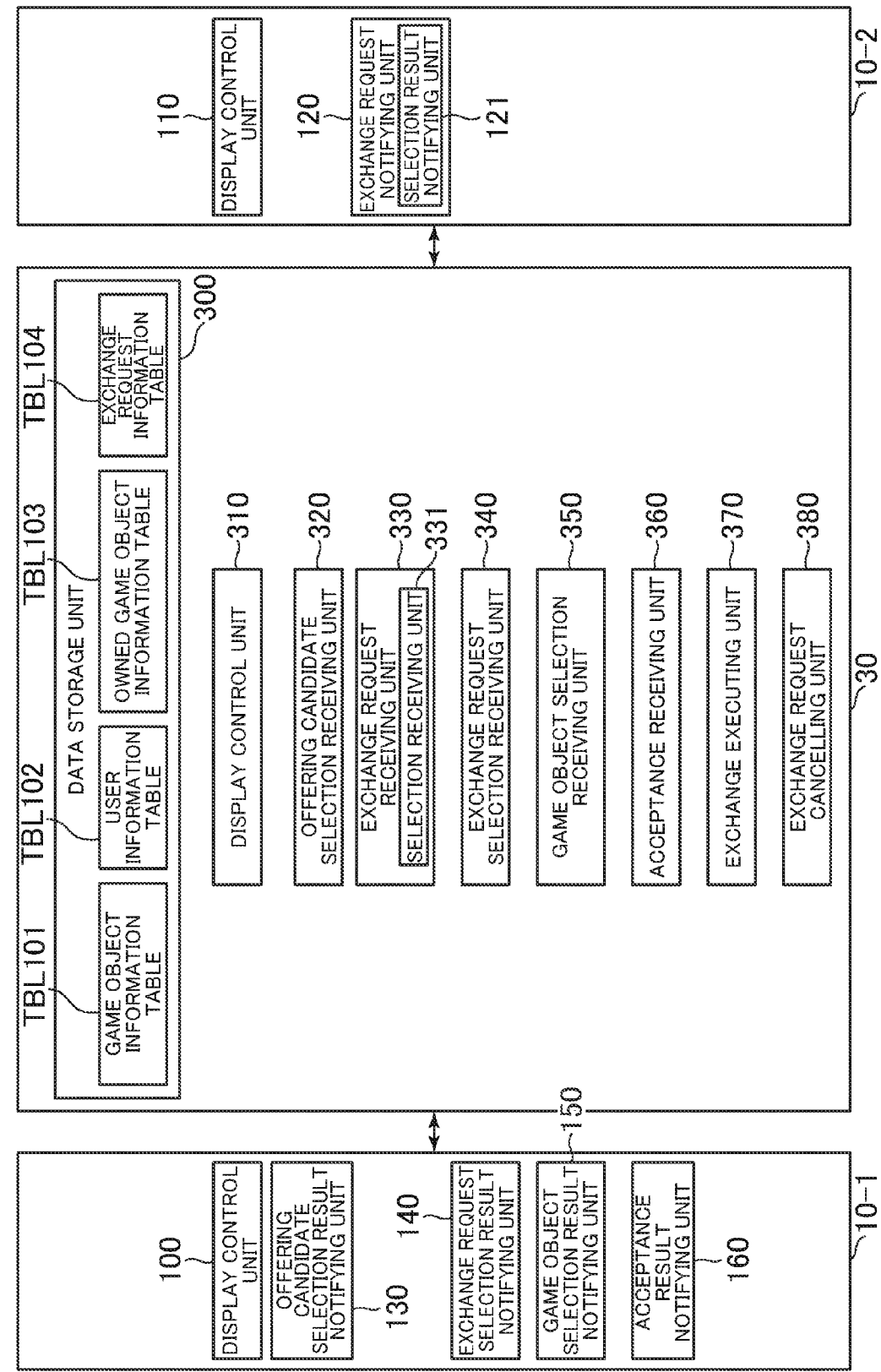
FIG. 16 is a functional block diagram of the game system according to an embodiment.

FIG. 16 is a functional block diagram illustrating functions that are implemented in the game system 1 and related to the present invention.

As shown in FIG. 16, the server 30 functionally includes a data storage unit 300, a display control unit 310, an offering candidate selection receiving unit 320, an exchange request receiving unit 330, an exchange request selection receiving unit 340, a game object selection receiving unit 350, an acceptance receiving unit 360, an exchange executing unit 370, and an exchange request cancelling unit 380. These functions are implemented in the server 30 when the control unit 31 executes the processing according to a program stored in the storage unit 32.

As shown in FIG. 16, the first terminal 10-1 functionally includes a display control unit 100, an offering candidate selection result notifying unit 130, an exchange request selection result notifying unit 140, a game object selection result notifying unit 150, and an acceptance result notifying unit 160. These functions are implemented in the first terminal 10-1 when the control unit 11 executes the processing according to a program stored in the storage unit 12.

As shown in FIG. 16, the second terminal 10-2 functionally includes a display control unit 110 and an exchange request notifying unit 120. These functions are implemented in the second terminal 10-2 when the control unit 11 executes the processing according to a program stored in the storage unit 12.

[3.1. Data Storage Unit 300]

The data storage unit 300 is implemented mainly by the storage unit 32 of the server 30. The data storage unit 300 may be implemented by a storage unit included in another device capable of data communication with the server 30. The data storage unit 300 stores various kinds of data necessary for games executed in the game system 1. For example, the data storage unit 300 stores information about game objects used in games executed in the game system 1, information about the game objects of respective users, information about the game objects that the users want to obtain, information for exchanging the game objects with other users, information about situations of respective users in the game, and information for controlling games executed by using the game objects.

The following will discuss examples of data stored in the data storage unit 300, such as a game object information table TBL101, a user information table TBL102, an owned game object information table TBL103, and an exchange request information table TBL104.

[3.1.1. Game Object Information Table TBL101]

FIG. 17 shows an example of the game object information table TBL101 stored in the data storage unit 300. The game object information table TBL101 is a data table in which information associated with game cards (an example of a game object) provided in a game is stored.

The items of information stored in association with identification information of a game card correspond to "information associated with a game card." In the example shown in FIG. 17, the game object information table TBL101 stores information about items such as "name" of a game card, "card image" specifying image data of the game card, "rarity" of the game card, "distributed number" of the game card, "special ability" of the game card, "offensive power" of the game card, "defensive power" of the game card, "cost" of the game card, "sale price" of the game card, and "appearance date and time" of the game card, in association with "card ID" for uniquely identifying the game card. In this regard, information associated with the game card is not limited to the information shown in FIG. 17.

The "rarity" corresponds to scarcity information indicating scarcity of the game card. The "distributed number" is information about the number of game cards in the games. For example, "distributed number" also corresponds to information about scarcity of the game card. When the "distributed number" is smaller, the scarcity of the game card is higher.

The "special ability" indicates whether the game card has special ability and a type of the special ability. In a game where a game card competes with another game card (referred to as an enemy), the "special ability" is also described as a special effect generated when competing with an enemy. The "offensive power" is information about offensive power to attack the enemy. The "defensive power" is information about defensive power when being attacked by the enemy.

The "cost" is information indicating magnitude of the cost required for using the game card. For example, in a case of a game where a deck is constructed using game cards, the "cost" indicates magnitude of a cost required for incorporating game cards into the deck. Further, for example, in a game for competing with other game cards using a game card, the "cost" indicates magnitude of a cost required for making the game card to participate in the competition.

The "sale price" is an amount of money to be obtained when the game card is sold. For example, the "sale price" may be represented in a virtual currency distributed in the game. The "appearance date and time" is a date and time on which a game card first appears in the game. In other words, the "appearance date and time" is information about a date and time on which the game card is available to the user.

[3.1.2. User Information Table TBL102]

FIG. 18 shows an example of the user information table TBL102 stored in the data storage unit 300. The user information table TBL102 is a data table in which information associated with users to play the game is stored. For example, the "information associated with users" includes a list of identification information about game cards (an example of a game object) that the users want to obtain.

As shown in FIG. 18, the user information table TBL102 stores information about items such as a "user name" indicating a user's name and "wish list" indicating a list of identification information of game cards that the user wants to obtain in association with "user ID" for uniquely identifying the user.

A game card registered in the "wish list" may be specified by the user from all or a part of the game cards available in the game system 1, or determined regardless of the user's specification.

[3.1.3. Owned Game Object Information Table TBL103]

FIG. 19 shows an example of the owned game object information table TBL103 stored in the data storage unit 300. The owned game object information table TBL103 is a data table in which information about game cards (an example of a game object) owned by users is stored.

In the example shown in FIG. 19, the owned game object information table TBL103 stores information about items such as "card ID" for uniquely identifying a type of a game card owned by the user, "serial number" for uniquely identifying game cards having the same card ID, "card level" indicating a level of the game card, "special ability level" indicating a level of special ability of the game card, "date and time of obtainment" indicating a date and time on which the game card is obtained, and "submit flag" indicating whether the game card is selected as a submission card, in association with the user with "user ID" for uniquely identifying the user. In a case where the user has multiple copies of the same game card, these game cards have the same card ID, but have different serial numbers.

The "card level" is, for example, an index indicating performance level of a game card. For example, the "card level" is represented by a numerical value. For example, offensive power and defensive power of a game card correspond to an example of "performance of a game card." The "special ability level" is, for example, an index indicating magnitude of special ability of a game card.

For example, in a case where the user uses a lottery ticket for obtaining a game card and obtains a game card selected from multiple types of game cards by lottery, the date and time on which the lottery is executed is stored in the "date and time of obtainment." For example, in a case where the user obtains a game card as a reward for achieving a task of the game, the date and time on which the task is achieved is stored in "date and time of obtainment." For example, in a case where the user obtains a game card by exchanging game cards with another user, the date and time on which the exchange of the game cards is executed is stored in the "date and time of obtainment."

The "submit flag" stores, for example, "1" when the game card is selected as a submission card, and "0" when the game card is not selected as a submission card. In this regard, the "submission card" is a game card that a user offers to another user in exchange for a game card from the another user. Further, information about the "submit flag" is updated based on information received at the offering candidate selection receiving unit 320 described later.

[3.1.4. Exchange Request Information Table TBL104]

FIG. 20 shows an example of the exchange request information table TBL104 stored in the data storage unit 300. The exchange request information table TBL104 is a data table in which information about exchange requests of game cards between users is stored.

The "exchange request of game cards" is a request for exchanging game cards. For example, the "exchange request of game cards" is a request from a second user to a first user to exchange one or more game cards (desired card) selected by the second user from the game cards owned by the first user and having a submit flag "1" (submission card) for one or more game cards (offered card) selected by the second user from the game cards owned by the second user. In a case where the first user accepts the exchange request from the second user, the desired card and the offered card are exchanged between the first user and the second user.

In the example shown in FIG. 20, the exchange request information table TBL104 stores information about items such as "requesting user ID" for identifying a user from whom a request for an exchange is made (i.e., a user who requests for an exchange, hereinafter also referred to as "requesting user"), "requested user ID" for identifying a user who is requested to exchange (i.e., a user who receives a request for an exchange, hereinafter also referred to as "requested user"), "desired card" indicating a game card that the requesting user wishes to obtain from the requested user, "offered card" indicating a game card that requesting user offers to the requested user, "request receiving date and time" indicating a date and time on which the exchange request is received, "status flag" indicating a status of the exchange request, in association with "exchange request ID" for uniquely identifying the exchange request. The information stored in the exchange request information table TBL104 may be registered based on information received by the exchange request receiving unit 330 described later.

In an item of the "desired card", a card ID and a serial number of a game card selected as a desired card are stored.

Similarly, in an item of "offered card", a card ID and a serial number of a game card selected as an offered card is stored.

An item of "status flag" includes a numerical value corresponding to the status of the exchange request depending on whether the status is "awaiting acceptance (flag value=0)", "accepted (flag value=1)", or "denied or cancelled (flag value=2)." For example, at the time when the exchange request (hereinafter, target exchange request) is received from the requesting user, a value of "status flag" is initialized to "0." If the requested user accepts the exchange request, the value of "status flag" is updated to "1." In other words, if the "status flag" is "1", the exchange request is accepted and the exchange is executed. Further, when the requested user denied the exchange request, or the requested user accepts another exchange request and thus the exchange according to the exchange request is no longer executed, the "status flag" is updated to "2."

[3.2. Display Control Unit 310,100,110]

The display control unit 310 is implemented mainly by the control unit 31, the storage unit 32, and the communication unit 33 of the server 30.

The display control unit 310 executes control for displaying a screen image on a display device of a user.

"A display device of a user" is, for example, a terminal used by the user and provided with a display unit. Examples of "a display device of a user" include a mobile phone (including smartphone), a tablet computer, a laptop computer, and a portable game machine. Alternatively, "a display device of a user" is, for example, a display device connected to the terminal used by the user. For example, a stationary game machine or a display device connected to a desktop computer also corresponds to an example of "a display device of a user."

"Executes control for displaying a screen image on a display device of a user" is, for example, generating a screen image and displaying the screen image on a display device. Alternatively, "executes control for displaying a screen image on a display device of a user" is, for example, generating data for displaying a screen image and sending the data to a display device or a terminal connected to the display device, thereby displaying the screen image on the display device. In this embodiment, the display control unit 310 is implemented by the server 30. As such, the display control unit 310 generates data for displaying a screen image and sends the generated data to the terminal 10, thereby displaying the screen image on the display unit 15 of the terminal 10.

The display control unit 100 is implemented mainly by the control unit 11, the storage unit 12, and the communication unit 13 of the first terminal 10-1.

The display control unit 100 executes control for displaying a screen image on the display unit 15 of the first terminal 10-1. For example, the display control unit 100 receives data from the display control unit 310 of the server 30, and displays a screen image on the display unit 15 of the first terminal 10-1 based on the received data. For example, the screen images shown in FIGS. 2 to 5 and 11 to 14 correspond to examples of the screen image displayed on the display unit 15 of the first terminal 10-1 by the display control unit 100.

The display control unit 110 is implemented mainly by the control unit 11, the storage unit 12, and the communication unit 13 of the second terminal 10-2.

The display control unit 110 executes control for displaying a screen image on the display unit 15 of the second terminal 10-2. For example, the display control unit 110 receives data from the display control unit 310 of the server 30, and displays a screen image on the display unit 15 of the second terminal 10-2 based on the received data. For example, the screen images shown in FIGS. 2, 4, and 6 to 10 correspond to examples of the screen image displayed on the display unit 15 of the second terminal 10-2 by the display control unit 110.

[3.3. Offering Candidate Selection Receiving Unit 320 and Offering Candidate Selection Result Notifying Unit 130]

The offering candidate selection receiving unit 320 is implemented mainly by the control unit 31, the storage unit 32, and the communication unit 33 of the server 30. The offering candidate selection result notifying unit 130 is mainly implemented by the control unit 11, the storage unit 12, the communication unit 13, and the input unit 14 of the first terminal 10-1.

The offering candidate selection receiving unit 320 receives, from a first user identified by the first user ID, a selection of at least one of the game cards associated with the first user ID (an example of first user identification information) as a submission card (an example of an offering candidate game object).

Here, "first user ID" is user identification information of a user who selects a submission card. The first user ID is a user ID of the first user. In other words, a user who is identified by the first user ID is the first user.

The "submission card" is a game card that is a candidate to be offered by exchange. That is, the "submission card" is a game card that the first user considers to offer by exchanging game cards. In other words, the "submission card" is a game card that the first user considers to allow another user to select as a desired card.

"Receives selecting a game card from the user" is, for example, to receive an operation of the user to select a game card. Alternatively, "receives selecting a game card from the user" is, for example, to receive, from the user's terminal, data indicating that the game card is selected. In this embodiment, the offering candidate selection receiving unit 320 is implemented in the server 30, and thus, the offering candidate selection receiving unit 320 receives data indicating that a submission card is selected from the first terminal 10-1 (offering candidate selection result notifying unit 130), as described later.

Upon receiving the selection of the submission card from the first user, the display control unit 310 executes control for displaying, on the first terminal 10-1, a submission screen image G1300 to select at least one of the game cards associated with the first user ID as a submission card.

For example, the display control unit 310 generates data for displaying the submission screen image G1300, and sends the generated data to the first terminal 10-1. In this case, the display control unit 100 of the first terminal 10-1 displays the submission screen image G1300 on the display unit 15 of the first terminal 10-1 based on the received data.

While the submission screen image G1300 is displayed, the offering candidate selection result notifying unit 130 monitors whether an operation to select a submission card from the game cards (owned cards of the first user) associated with the first user ID is received through the input unit 14 of the first terminal 10-1. For example, in the case of the submission screen image G1300, an operation to check a checkbox corresponding to the game card and select the processing object P1301 corresponds to the operation described above.

When the operation to select the submission card is received, the offering candidate selection result notifying unit 130 sends information indicating the selection result of the submission card to the server 30. For example, the offering candidate selection result notifying unit 130 sends the user ID of the first user (user Ua) and information about the submission card selected by the first user to the server 30. Here, "information about the submission card" is, for example, a card ID and a serial number of the game card selected as a submission card.

The offering candidate selection receiving unit 320 receives the information (user ID, card ID, serial number) from the offering candidate selection result notifying unit 130, thereby receiving the selection of the submission card. In this case, the offering candidate selection receiving unit 320 searches the owned game object information table TBL103 for a record that stores information about the received user ID, card ID, and serial number, and updates a value of "submit flag" of the searched record to "1."

[3.4. Exchange Request Receiving Unit 330 and Exchange Request Notifying Unit 120]

The exchange request receiving unit 330 is implemented mainly by the control unit 31, the storage unit 32, and the communication unit 33 of the server 30. The exchange request notifying unit 120 is implemented mainly by the control unit 11, the storage unit 12, the communication unit 13, and the input unit 14 of the second terminal 10-2.

The exchange request receiving unit 330 receives, from the second user identified by the second user ID, an exchange request for exchanging at least one desired card selected from the game cards associated with the first user ID (an example of first user identification information) for at least one offered card selected from the game cards associated with the second user ID (second user identification information).

Here, the "first user ID" is a user ID of a user who is requested for an exchange of game cards. The first user ID is a user ID of the first user. In other words, a user who is identified by the first user ID is the first user.

The "second user ID" is a user ID of a user who requests for an exchange of game cards. The second user ID is a user ID of the second user. In other words, a user who is identified by the second user ID is the second user.

The "desired card" is a game card that the second user wishes to obtain by exchanging game cards between the first user ID and the second user ID. In other words, the "desired card" is a game card that the second user wishes to receive by exchange.

The "offered card" is a game card that the second user wishes to offer by exchanging game cards between the first user ID and the second user ID. In other words, the "offered card" is a game card that the second user wishes to give by exchange.

"Exchange request of game cards" is to request an exchange of game cards. Further, "receive an exchange request for game cards from a user" is, for example, to receive an operation for an exchange request from a user. Further, "receive an exchange request for game cards from a user" is, for example, to receive data relating to an exchange request from the user's terminal (e.g., second terminal 10-2). In this embodiment, the exchange request receiving unit 330 is implemented by the server 30, and thus, the exchange request receiving unit 330 receives data relating to an exchange request from the second terminal 10-2 (exchange request notifying unit 120), as described below.

As shown in FIG. 16, the exchange request receiving unit 330 includes a selection receiving unit 331, and the exchange request notifying unit 120 includes a selection result notifying unit 121.

The selection receiving unit 331 receives a selection of a desired card and a selection of an offered card from the second user.

"A selection of a desired card" is, for example, to select a desired card. That is, "a selection of a desired card" is to select at least one of the game cards associated with the first user ID as a desired card.

"A selection of an offered card" is, for example, to select an offered card. That is, "a selection of an offered card" is to select at least one of the game cards associated with the second user ID as an offered card.

The selection receiving unit 331 may receive the selections of the desired card and the offered card separately or at the same time.

The selection receiving unit 331 receives a selection of any combination of game cards from the second user as at least one of a desired card and an offered card in one exchange. In this regard, "receives a selection of any combination of game cards from the second user as at least one of a desired card and an offered card in one exchange" means one of the three examples below.

[1] To receive a selection of any combination of game cards as a desired card in one exchange, and also receive a selection of any combination of game cards as an offered card in one exchange.

[2] To receive a selection of any combination of game cards as a desired card in one exchange, while being restricted from receiving a selection of any combination of game cards as an offered card in one exchange.

[3] To receive a selection of any combination of game cards as an offered card in one exchange, while being restricted from receiving a selection of any combination of game cards as a desired card in one exchange.

Further, "receives a selection of any combination of game cards" means that, when selecting a game card, for example, the user can freely determine the number of game cards to select or which game card to select.

Further, "being restricted from receiving a selection of any combination of game cards" means that, when selecting a game card, for example, the user cannot freely determine at least either one of the number of game cards to select and which game card to select. Examples of "being restricted from receiving a selection of any combination of game cards" include the number of selectable game cards being less than a predetermined range (e.g., two or less), the selectable game cards being limited, or combinations of the selectable game cards being limited, for example.

For example, the selection receiving unit 331 receives a selection of a desired card. That is, the selection receiving unit 331 receives, from the second user, a selection of at least one of the game cards associated with the first user ID as a desired card. For example, the selection receiving unit 331 receives, from the second user, as a desired card, a selection of at least one of the game cards selected as submission cards by the first user.

Upon receiving the selection of the desired card from the second user, the display control unit 310 executes control for displaying the desired card selecting screen image G2200 (an example of a desire selection screen image) for selecting at least one of the game cards associated with the first user ID as a desired card on the display unit 15 (an example of the display device of the second user) of the second terminal 10-2.

For example, in a case where the second user selects the first user from the users displayed on the display area A2110 of the search result display screen image G2100, the display control unit 310 generates data for displaying the desired card selecting screen image G2200, and sends the generated data to the second terminal 10-2. In this case, the display control unit 110 of the second terminal 10-2 displays the desired card selecting screen image G2200 on the display unit 15 of the second terminal 10-2 based on the received data.

Here, the "desired card selecting screen image" is a screen image for receiving a selection of at least one of the game cards associated with the first user ID as a desired card. For example, the "desired card selecting screen image" is a screen image configured to be capable of displaying a list of the game cards associated with the first user ID, and also capable of selecting at least one of the game cards associated with the first user ID.

Further, the "desired card selecting screen image" displays information about an existing exchange request in which a game card associated with the first user ID is selected as a desired card.

The "existing exchange request" is an exchange request waiting for an acceptance. That is, the "existing exchange request" is an exchange request that is already received and not accepted. In other words, the "existing exchange request" is an exchange request that is already received, not yet accepted, and not yet cancelled. For example, the "existing exchange request" is an exchange request having "0" as a value of the "status flag" in the exchange request information table TBL104.

Further, the "information about an existing exchange request" is, for example, information indicating whether there is an exchange request or the number of exchange requests. For example, the "information about an existing exchange request" may be information about a list of exchange requests. For example, the "information about an existing exchange request" may be information about content of an exchange request. For example, "information about content of an exchange request" corresponds to information about a user who has made an existing exchange request, a desired card, or an offered card. Further, for example, the "information about an existing exchange request" may be information about whether there is an exchange request, and a link to a screen showing the number, a list, or content of existing exchange requests. For example, the processing object P202122 in the desired card selecting screen image G2200 shown in FIG. 8 corresponds to an example of "information about an existing exchange request."

While the desired card selecting screen image G2200 is displayed, the selection result notifying unit 121 monitors whether an operation to select any combination of game cards as a desired card is received through the input unit 14 of the second terminal 10-2. For example, in the case of the desired card selecting screen image G2200, an operation to check a checkbox corresponding to the game card to select the processing object P2201 corresponds to the operation mentioned above.

When the operation to select the desired card is received, the selection result notifying unit 121 sends information about the selection result of the desired card to the server 30. For example, the selection result notifying unit 121 sends information about the user ID of the second user (user Ub) and the desired card selected by the second user to the server 30. Here, the "information about the desired card" includes, for example, the user ID of the first user who owns the game card selected as the desired card, and the card ID and the serial number of the game card selected as the desired card. In this case, the selection receiving unit 331 receives the selection of the desired card by receiving the information from the second terminal 10-2.

The selection receiving unit 331 receives a selection of an offered card. That is, the selection receiving unit 331 receives, as an offered card, a selection of at least one of the game cards associated with the second user ID from the second user. In other words, the selection receiving unit 331 receives, as an offered card, a selection of at least one of the cards owned by the second user from the second user.

When the selection of the offered card is received from the second user, the display control unit 310 executes control for displaying, on the second terminal 10-2 (an example of the display device of the second user), the offered card selecting screen image G2300 (an example of an offer selection screen image) for selecting at least one of the game cards associated with the second user ID as the offered card. For example, the display control unit 310 executes the control based on the "wish list" (an example of list data of game cards that the first user wishes to obtain) of the first user stored in association with the first user ID.

For example, the display control unit 310 generates data for displaying the offered card selecting screen image G2300, and sends the generated data to the second terminal 10-2. In this case, the display control unit 110 of the second terminal 10-2 displays the offered card selecting screen image G2300 on the display unit 15 of the second terminal 10-2 based on the received data.

The "offered card selecting screen image" is a screen image for receiving a selection of at least one of the game cards associated with the second user ID as an offered card. For example, the "offered card selecting screen image" is a screen image configured to be capable of displaying a list of the game cards associated with the second user ID, and also capable of selecting at least one of the game cards associated with the second user ID.

On the "offered card selecting screen image", a game card associated with the second user ID and included in the wish list (an example of list data of game cards that the first user wants to obtain) of the first user is preferentially or separately displayed.

The "list data of game cards" is data indicating a list of game cards. For example, the "list data of game cards" is data indicating a list of identification information the game cards.

"Preferentially displaying a game card included in the wish list" is to display a game card included in the wish list in preference to a game card that is not included in the wish list. For example, in a case where the game cards are displayed in order of priority (display order), an example of "preferentially displaying" corresponds to setting a priority (display order) of a game card included in the wish list higher than a priority (display order) of a game card that is not included in the wish list. For example, an example of "preferentially displaying" also corresponds to displaying a game card included in the wish list at a position that is more noticeable than a position of a game card that is not included in the wish list. For example, an example of "preferentially displaying" also corresponds to displaying a game card included in the wish list and not displaying a game card that is not included in the wish list.

For example, in the offered card selecting screen image G2300 shown in FIG. 9, an example of "preferentially displaying" corresponds to displaying the game cards Cx and Cy included in the wish list of the user Ua in an upper part.

Further, "separately displaying a game card included in the wish list" is to display the game cards so that the user can distinguish a game card included in the wish list from a game card that is not included in the wish list. For example, an example of "separately displaying" corresponds to differentiating display manners (e.g., color, brightness, size) of a game card included in the wish list from display manners of a game card that is not included in the wish list. For example, an example of "separately displaying" corresponds to differentiating display manners (e.g., color, brightness, size, shape, type, thickness of a line) of a mark or a frame etc. displayed in association with the game card included in the wish list from display manners of a mark or a frame etc. of the game card that is not included in the wish list. For example, an example of "separately displaying" corresponds to displaying a mark or a frame etc. only in association with the game card included in the wish list, and not displaying a mark or a frame etc. in association with the game card that is not included in the wish list. Alternatively, an example of "separately displaying" corresponds to not displaying a mark or a frame etc. in association with the game card included in the wish list, and displaying a mark or a frame etc. only in association with the game card that is not included in the wish list. For example, an example of "separately displaying" corresponds to separate an area to display the game card included in the wish list from an area to display the game card that is not included in the wish list.

For example, in the offered card selecting screen image G2300 shown in FIG. 9, an example of "separately displaying" corresponds to displaying frame images P203112 and P2031212 on the game cards Cx and Cy that are included in the wish list of the user Ua.

While the offered card selecting screen image G2300 is displayed, the selection result notifying unit 121 monitors whether an operation to select any combination of the game cards as an offered card is received through the input unit 14 of the second terminal 10-2. For example, in the case of the offered card selecting screen image G2300, an operation to check a checkbox corresponding to the game card to select the processing object P2301 corresponds to the operation mentioned above.

When the operation to select the offered card is received, the selection result notifying unit 121 sends information about the selection result of the offered card to the server 30. For example, the selection result notifying unit 121 sends information about the user ID of the second user (user Ub) and the offered card selected by the second user to the server 30. Here, the information of the offered card includes, for example, the card ID and the serial number of the game card selected as the offered card. In this case, the selection receiving unit 331 receives the information from the second terminal 10-2, thereby receiving the selection of the offered card.

When the selection of the desired card and the selection of the offered card are received, the display control unit 310 executes control for displaying the exchange request viewing screen image G2400 on the display unit 15 of the second terminal 10-2.

For example, the display control unit 310 generates data for displaying the exchange request viewing screen image G2400, and sends the generated data to the second terminal 10-2. In this case, the display control unit 110 of the second terminal 10-2 displays the exchange request viewing screen image G2400 on the display unit 15 of the second terminal 10-2 based on the received data.

While the exchange request viewing screen image G2400 is displayed, the exchange request notifying unit 120 monitors whether an operation to determine making an exchange request is received through the input unit 14 of the second terminal 10-2. For example, in the case of the exchange request viewing screen image G2400, an operation to select the processing object P2401 corresponds to the operation mentioned above.

When the operation to determine making the exchange request is received, the exchange request notifying unit 120 sends information relating to the exchange request to the server 30. Here, the information to be sent includes, for example, the user ID of the second user (user Ub) who is the requesting user of the exchange, the user ID of the first user (user Ua) who is the requested user of the exchange, information about the game card selected as the desired card, and information about the game card selected as the offered card. In this case, the exchange request receiving unit 330 receives the information from the exchange request notifying unit 120, thereby receiving the exchange request.

Upon receiving a new exchange request, the exchange request receiving unit 330 generates a new record in the exchange request information table TBL 04 based on the received exchange request, and registers the information in the generated record. For example, the exchange request receiving unit 330 issues a new exchange request ID, and stores the issued exchange request ID, the user ID (requesting user ID) of the requesting user of the exchange, the user ID (requested user ID) of the requested user of the exchange, the desired card, the offered card, the request receiving date and time (which may be the date and time of receiving the request), and the status flag (initial value=0) in the generated new record.

The exchange request receiving unit 330 can receive multiple exchange requests in which the same game card associated with the first user ID is selected as the desired card.

[3.5. Exchange Request Selection Receiving Unit 340 and Exchange Request Selection Result Notifying Unit 140]

The exchange request selection receiving unit 340 is implemented mainly by the control unit 31, the storage unit 32, and the communication unit 33 of the server 30. The exchange request selection result notifying unit 140 is implemented mainly by the control unit 11, the storage unit 12, the communication unit 13, and the input unit 14 of the first terminal 10-1.

The exchange request selection receiving unit 340 receives a selection of the exchange requests to the first user ID from the first user identified by the first user ID.

Here, "the exchange request to the first user ID" is an exchange request in which a game card associated with the first user ID is selected as a desired card. For example, "the exchange request to the first user ID" is an exchange request that the first user can determine whether to accept or not.

Further, "receives a selection of the exchange requests from the user" is, for example, to receive an operation of the user to select an exchange request. Alternatively, "receives a selection of the exchange requests from the user" is to receive, from the terminal of the user, data indicating that an exchange request has been selected, for example. In this embodiment, the exchange request selection receiving unit 340 is implemented by the server 30, and thus the exchange request selection receiving unit 340 receives data indicating that the exchange request has been selected from the first terminal 10-1 (exchange request selection result notifying unit 140), as described below.

When the selection of the exchange request is received from the first user, the display control unit 310 executes control for displaying the exchange request list screen image G1400 showing a list of the exchange requests to the first user ID on the display unit 15 (an example of a display device of the first user) of the first terminal 10-1. For example, the display control unit 310 executes the control mentioned above based on the wish list (an example of the list data of the game cards that the first user wishes to obtain) of the first user stored in association with the first user ID.

For example, the display control unit 310 generates data for displaying the exchange request list screen image G1400 showing a list of at least one exchange request, in which the first user ID is stored as a requested user ID and which has "0" (awaiting acceptance) as a value of "status flag", based on the exchange request information table TBL104, and sends the generated data to the first terminal 10-1. In this case, the display control unit 100 of the first terminal 10-1 displays the exchange request list screen image G1400 on the display unit 15 of the first terminal 10-1 based on the received data.

The "exchange request list screen image" is a screen image configured to be capable of displaying a list of exchange requests to the first user ID. For example, the "exchange request list screen image" is a screen image for selecting one of the exchange requests to the first user ID. Further, for example, the "exchange request list screen image" is a screen image for accepting one of the exchange requests to the first user ID.

On the "exchange request list screen image", an exchange request that is toward the first user ID and selects a game card included in the wish list of the first user as an offered card is preferentially or separately displayed.

"Preferentially display an exchange request that selects a game card included in the wish list of the first user as an offered card" is to display an exchange request, in which a game card included in the wish list is selected as an offered card, in preference to other exchange requests (in which a game card included in the wish list is not selected as an offered card). For example, an example of "preferentially display" corresponds to displaying only an exchange request in which a game card included in the wish list is selected as an offered card and not displaying other exchange requests. For example, an example of "preferentially display" also corresponds to displaying an exchange request, in which a game card included in the wish list is selected as an offered card, at a position that is more noticeable than positions of other exchange requests. For example, in a case where the exchange requests are displayed in order of priority (display order), an example of "preferentially displaying" also corresponds to setting a priority (display order) of an exchange request in which a game card included in the wish list is selected as an offered card higher than other exchange requests.

For example, in the exchange request list screen image G1400 shown in FIG. 11, an example of "preferentially displaying" corresponds to displaying, in an upper part, an exchange request in which the game cards Cx and Cy included in the wish list of the user Ua are selected as offered cards.

Further, "separately displaying an exchange request that selects a game card included in the wish list of the first user as an offered card" is to display exchange requests so that the user can distinguish an exchange request in which a game card included in the wish list is selected as an offered card from other exchange request (in which a game card included in the wish list is not selected as an offered card). For example, an example of "separately displaying" corresponds to differentiating display manners (e.g., color, brightness, size) of an exchange request, in which a game card included in the wish list is selected as an offered card, from display manners of other exchange requests. For example, an example of "separately displaying" corresponds to differentiating display manners (e.g., color, brightness, size, shape, type, thickness of a line) of a mark or a frame etc. displayed in association with an exchange request, in which a game card included in the wish list is selected as an offered card, from display manners of a mark or a frame etc. displayed in association with other exchange requests. For example, an example of "separately displaying" corresponds to displaying a mark or a frame etc. only in association with an exchange request in which a game card included in the wish list is selected as an offered card, and not displaying a mark or a frame etc. in association with other exchange requests. Alternatively, an example of "separately displaying" corresponds to not displaying a mark or a frame etc. in association with an exchange request in which a game card included in the wish list is selected as an offered card, and displaying a mark or a frame etc. only in association with other exchange requests. For example, an example of "separately displaying" corresponds to separating an area to display an exchange request, in which a game card included in the wish list is selected as an offered card, from an area to display other exchange requests.

For example, in the exchange request list screen image G1400 shown in FIG. 11, an example of "separately displaying" corresponds to displaying frame images on the game cards Cx and Cy that are included in the wish list of the user Ua.

While the exchange request list screen image G1400 is displayed, the exchange request selection result notifying unit 140 monitors whether an operation to select an exchange request from the exchange requests to the first user ID is received through the input unit 14 of the first terminal 10-1. For example, in the case of the exchange request list screen image G1400, an operation to select one of the exchange requests displayed in the display area A1410 corresponds to the operation mentioned above.

When the operation to select an exchange request is received, the exchange request selection result notifying unit 140 sends information about the selection result of the exchange request to the server 30. For example, the exchange request selection result notifying unit 140 sends the exchange request ID that identifies the selected exchange request to the server 30. In this case, the exchange request selection receiving unit 340 receives the information from the exchange request notifying unit 120, thereby receiving the exchange request.

In a case where the exchange request selection receiving unit 340 receives a selection of one exchange request among from the exchange requests to the first user ID, the display control unit 310 executes control for displaying the exchange request accepting screen image G1500 (an example of an exchange request content screen image) indicating content of the one exchange request on the display device of the first user identified by the first user ID.

For example, the display control unit 310 executes control for displaying the exchange request accepting screen image G1500 (an example of an exchange request content screen image) on the display device of the first user based on the wish list (an example of list data of the game cards that the first user wants to obtain) of the first user stored in association with the first user ID.

The "exchange request content screen image" is a screen image configured to be capable of displaying content of the exchange request to the first user ID. For example, the "exchange request content screen image" is a screen image for confirming the content of the exchange request to the first user ID. Further, for example, the "exchange request content screen image" is a screen image for accepting the exchange request to the first user ID.

For example, the display control unit 310 generates data for displaying the exchange request accepting screen image G1500, and sends the generated data to the first terminal 10-1. In this case, the display control unit 100 of the first terminal 10-1 displays the exchange request accepting screen image G1500 on the display unit 15 of the first terminal 10-1 based on the received data.

For example, a game card that is selected as an offered card in one exchange request and included in the wish list is preferentially or separately displayed on the exchange request accepting screen image G1500. For example, in the display area A1511 of the exchange request accepting screen image G1500 shown in FIG. 12, an example of "separately display" corresponds to displaying a frame image on the game card Cx, which is included in the wish list of the user Ua among the game cards Cx and Cz selected as the offered cards, and not displaying a frame image on the game card Cz, which is not included in the wish list of the user Ua.

The exchange request accepting screen image G1500 displays information about other exchange requests, in which a game card that is the same as the game card selected as a desired card in the one exchange request, is selected as a desired card. For example, in the display area A1512 of the exchange request accepting screen image G1500 shown in FIG. 12, an example of displaying "information about other exchange requests" corresponds to displaying the processing object P15121 indicating that the game card Cc selected as a desired card has received another exchange request.

The display control unit 310 may execute control for displaying information about an exchange request, which is other than the exchange request selected by the first user among from the plurality of exchange requests to the first user ID, and in which a game card that is the same as the game card selected as a desired card in the exchange request selected by the first user is selected as a desired card, on the display unit 15 of the first terminal 10-1.

For example, the display control unit 310 may execute control for displaying information about an exchange request, which is other than one exchange request displayed on the exchange request accepting screen image G1500, and in which a game card that is the same as the game card selected as a desired card in the one exchange request is selected as a desired card, on the exchange request accepting screen image G1500. For example, in the case of the exchange request accepting screen image G1500 shown in FIG. 12, information displayed on the display area A1520 corresponds to the "information" mentioned above.

For example, the display control unit 310 obtains information about the desired card associated with the exchange request ID of the exchange request displayed on the exchange request accepting screen image G1500 (i.e., the exchange request ID received at the exchange request selection receiving unit 340) in the exchange request information table TBL 104. The display control unit 310 searches the exchange request information table TBL104 for another exchange request that includes, in the items of "desired card", a game card that is the same as the obtained desired card. When another exchange request is searched as a result of the search, the display control unit 310 generates data for displaying the exchange request accepting screen image G1500 that includes information about such another exchange request in the display area A1520, and sends the generated data to the first terminal 10-1. The display control unit 100 of the first terminal 10-1 displays the exchange request accepting screen image G1500 on the display unit 15 of the first terminal 10-1 based on the data from the display control unit 310.

[3.6. Game Object Selection Receiving Unit 350 and Game Object Selection Result Notifying Unit 150]

The game object selection receiving unit 350 is implemented mainly by the control unit 31, the storage unit 32, and the communication unit 33 of the server 30. The game object selection result notifying unit 150 is implemented mainly by the control unit 11, the storage unit 12, the communication unit 13, and the input unit 14 of the first terminal 10-1.

The game object selection receiving unit 350 receives at least one selection from the game cards associated with the first user ID from the first user identified by the first user ID.

"Receives a selection from the game objects from the user" is, for example, to receive an operation to select a game object from the user. Alternatively, for example, "receives a selection from the game objects from the user" is to receive, from the user's terminal, data indicating that a game object has been selected. In this embodiment, the game object selection receiving unit 350 is implemented by the server 30, and thus the game object selection receiving unit 350 receives, from the first terminal 10-1 (game object selection result notifying unit 150), data indicating that a game object has been selected as described below.

For example, while the exchange request accepting screen image G1500 is displayed, the game object selection result notifying unit 150 monitors whether an operation to select one of the game cards is received through the input unit 14 of the first terminal 10-1. For example, in the case of the exchange request accepting screen image G1500, an operation to select the processing object P15121 displayed in association with the game card Cc (i.e., the processing object P15121 indicating that the game card Cc has received another exchange request) corresponds to the operation to select the game card Cc.

When the operation to select one of the game cards is received, the game object selection result notifying unit 150 sends information about the selection result of the game card to the server 30. For example, the game object selection result notifying unit 150 may send information for identifying the selected game card to the server 30. The information for identifying the game card includes a card ID and a serial number, for example. In this case, the game object selection receiving unit 350 receives the information from the game object selection result notifying unit 150, thereby receiving the selection of the game card.

When the game object selection receiving unit 350 receives the selection of the game object from the first user, the display control unit 310 executes control for displaying information about the exchange request, in which the game card selected by the first user is selected as a desired card, on the display unit 15 of the first terminal 10-1.

For example, the display control unit 310 searches the exchange request information table TBL104 for the list of exchange requests including a card ID and a serial number of the game card selected by the first user in the "desired card", generates data for displaying the exchange request list screen image G1600 indicating the searched list of exchange requests, and sends the generated data to the first terminal 10-1. The display control unit 100 of the first terminal 10-1 displays the exchange request list screen image G1600 on the display unit 15 of the first terminal 10-1 based on the data from the display control unit 310.

[3.7. Acceptance Receiving Unit 360 and Acceptance Result Notifying Unit 160]

The acceptance receiving unit 360 is implemented mainly by the control unit 31, the storage unit 32, and the communication unit 33 of the server 30. The acceptance result notifying unit 160 is implemented mainly by the control unit 11, the storage unit 12, the communication unit 13, and the input unit 14 of the first terminal 10-1.

The acceptance receiving unit 360 receives an acceptance of one exchange request among the plurality of exchange requests to the first user ID from the first user identified by the first user ID.

"Acceptance of exchange request" is to accept an exchange request.

Further, "receive an acceptance from the user" is, for example, to receive an operation to accept an exchange request from the user. Alternatively, "receive an acceptance from the user" is to receive data indicating that an exchange request is accepted from the terminal device of the user. In this embodiment, the acceptance receiving unit 360 is implemented by the server 30, and thus the acceptance receiving unit 360 receives data indicating that the exchange request is accepted from the first terminal 10-1 (acceptance result notifying unit 160) as described below.

For example, while the exchange request accepting screen image G1500 is displayed, the acceptance result notifying unit 160 monitors whether an operation to accept or deny the exchange request is received by the input unit 14 of the first terminal 10-1. For example, in the case of the exchange request accepting screen image G1500, the operation to select the processing object P1501 corresponds to "operation to accept the exchange request." Further, the operation to select the processing object P1502 corresponds to "operation to deny the exchange request."

When the operation to accept or deny the exchange request is received, the acceptance result notifying unit 160 sends information about the result of the exchange request to the server 30. For example, the acceptance result notifying unit 160 sends an exchange request ID for identifying the exchange request and information indicating the result of either "accept" or "deny" to the server 30.

In this case, the acceptance receiving unit 360 receives the information from the acceptance result notifying unit 160, thereby receiving an acceptance of the exchange request. Further, in this case, the acceptance receiving unit 360 updates a value of "acceptance flag", which is associated with the exchange request ID received from the acceptance result notifying unit 160, to "1" when the received result is "accept", and to "2" when the received result is "deny", in the exchange request information table TBL104.

[3.8. Exchange Executing Unit 370]

The exchange executing unit 370 is implemented mainly by the control unit 31, the storage unit 32, and the communication unit 33 of the server 30.

The exchange executing unit 370 executes an exchange of game cards based on the exchange request received at the receiving unit 330. That is, the exchange executing unit 370 exchanges the desired card for the offered card between the first user ID and the second user ID based on the exchange request received at the the exchange request receiving unit 330.

"Exchange of game cards" is to exchange game objects between a plurality of user IDs. For example, "exchange of game cards" is to exchange game objects between the first user ID and the second user ID. Further, "exchange of game cards" is to exchange a desired card for an offered card.

For example, "exchange game objects between the first user ID and the second user ID" is to exchange one or more desired cards selected from the game cards associated with the first user ID for one or more offered cards selected from the game cards associated with the second user ID.

That is, "exchange game objects between the first user ID and the second user ID" indicates that the desired card is added to the game cards associated with the second user ID in exchange for the offered card, and the offered card is added to the game cards associated with the first user identification information in exchange for the desired card.

In other words, "exchange game objects between the first user ID and the second user ID" is to remove the desired card from the game cards associated with the first user ID, add the desired card to the game cards associated with the second user ID, remove the offered card from the game cards associated with the second user ID, and add the offered card to the game cards associated with the first user ID.

"Executes an exchange of the desired card and the offered card based on the exchange request" is, for example, when an exchange request is received, to execute an exchange the desired card in the exchange request for the offered card in the exchange request. For example, "executes an exchange of the desired card and the offered card based on the exchange request" also corresponds to, when an exchange request is received, asking the first user whether to accept the exchange request, and when the exchange request is accepted by the first user, executing an exchange of the desired card in the exchange request for the offered card in the exchange request.

For example, when the first user accepts one exchange request among the exchange requests to the first user ID, the exchange executing unit 370 executes an exchange of the desired card in the one exchange request for the offered card in the one exchange request.

For example, when the acceptance receiving unit 360 receives an exchange request ID and a result, if the result suggests "accept", the exchange executing unit 370 executes an exchange of the desired card for the offered card, each in the exchange request identified by the exchange request ID.

Specifically, for example, the exchange executing unit 370 terminates the association between the requested user ID and the desired card in the accepted exchange request, and associates the requesting user ID and the desired card. Further, the exchange executing unit 370 terminates the association between the requesting user ID and the offered card in the accepted exchange request, and associates the requested user ID with the offered card.

[3.9. Exchange Request Cancelling Unit 380]

The exchange request cancelling unit 380 is implemented mainly by the control unit 31 and the storage unit 32 of the server 30.

When the first user accepts one exchange request among the exchange requests to the first user ID, the exchange request cancelling unit 380 cancels the other exchange requests in the exchange requests.

"Cancels the exchange request" is, for example, to deny (reject) the exchange request. In other words, "cancels the exchange request" is to void the exchange request. Further, for example, "cancels the exchange request" is to delete data indicative of the exchange request.

For example, when the acceptance receiving unit 360 receives an exchange request ID and a result, if the result suggests "accept", the exchange request cancelling unit 380 searches the exchange request information table TBL104 for another exchange request having the common desired cards at least in part to the exchange request identified by the exchange request ID, and cancels the searched exchange request. For example, the exchange request cancelling unit 380 updates the value of "status flag", which is stored in the exchange request information table TBL104 in association with the exchange request ID identified by the searched exchange request, to "2 (cancelled)", thereby cancelling the exchange request.

[4. Processing Executed in Game System 1]

Next, an example of processing executed in the game system 1 will be discussed. FIGS. 21 to 24 illustrate the processing executed in the game system 1. In the processing shown in FIGS. 21 to 24, the processing regarding the first terminal 10-1 is executed by the control unit 11 of the first terminal 10-1 based on a program stored in the storage unit 12, the processing regarding the second terminal 10-2 is executed by the control unit 11 of the second terminal 10-2 based on a program stored in the storage unit 12, and the processing regarding the server 30 is executed by the control unit 31 of the server 30 based on a program stored in the storage unit 32. In the following, the processing in a case where the game cards are exchanged between the first user (first user ID) and the second user (second user ID) will be discussed.

[4.1. Registration Processing of Submission Card Information]

Figure 21:
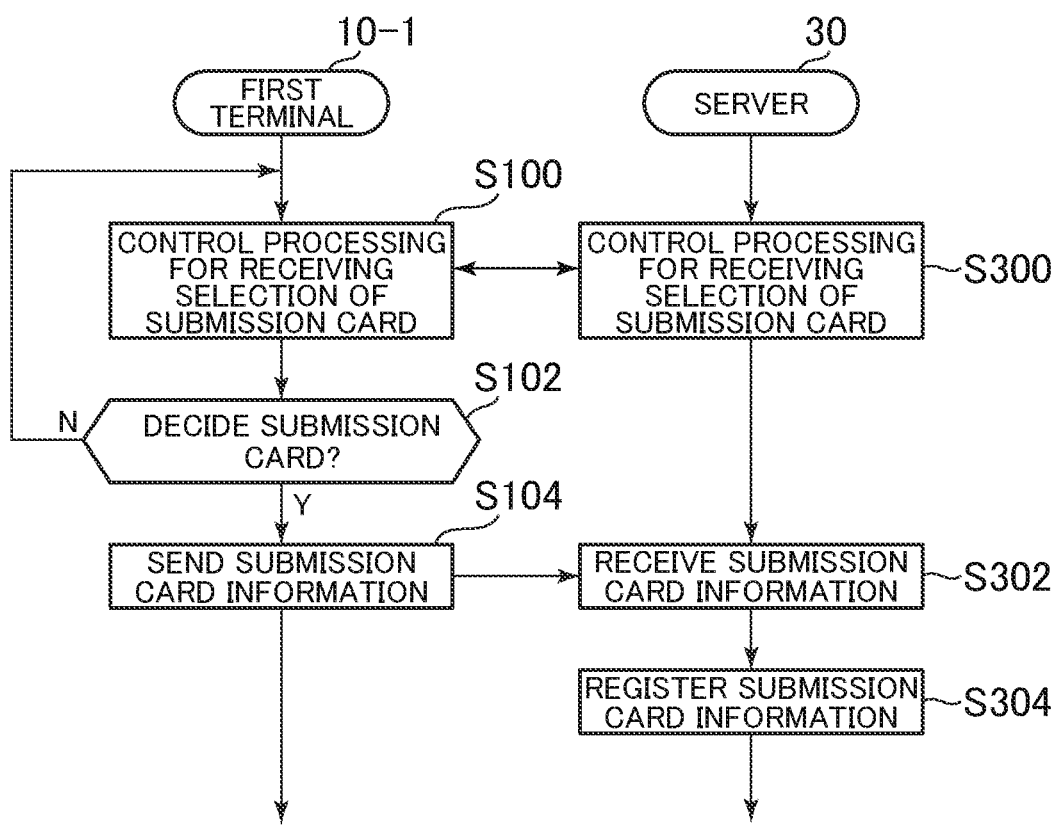
FIG. 21 is a sequence diagram of registration processing of a submission card.

Referring to FIG. 21, an example of the processing in which the first user registers one or more game cards in the server 30 as a submission card will be discussed. The processing shown in FIG. 21 corresponds to the processing described in the example of the screen shown in FIG. 5.

As shown in FIG. 21, the control unit 11 of the first terminal 10-1 communicates with the server 30 through the communication unit 13 based on an operation received from the first user through the input unit 14, and controls the processing for receiving, from the first user, a selection of a submission card from the game cards associated with the first user ID (S100). The control unit 31 of the server 30 also communicates with the first terminal 10-1 through the communication unit 33, and controls the processing for receiving, from the first user, a selection of a submission card from the game cards associated with the first user ID (S300).

For example, the control unit 31 of the server 30 generates data for displaying the submission screen image G1300 (FIG. 5) in which one or more game cards are selected, as a submission card, from the game cards owned by the first user based on the data received from the first terminal 10-1 through the communication unit 33, and sends the generates display data to the first terminal 10-1. For example, the control unit 11 of the first terminal 10-1 displays the submission screen image G1300 on the display unit 15 based on the data received from the server 30. While the submission screen image G1300 is displayed, the control unit 11 of the first terminal 10-1 specifies the game card selected as a submission card based on the operation from the first user.

The control unit 11 of the first terminal 10-1 determines whether the submission card is decided (i.e., whether a selection of a submission card is completed) based on the operation received from the first user through the input unit 14 (S102). For example, the control unit 11 of the first terminal 10-1 may determine that the submission card is decided when an operation to select processing object P1301 of the submission screen shown in FIG. 5 is received from the first user.

If it is not determined that a submission card is decided (S102:N), the control unit 11 of the first terminal 10-1 continues the selection control processing in S100. If it is determined that a submission card is decided (S103:Y), the control unit 11 of the first terminal 10-1 sends information (submission card information) about the submission card selected by the first user to the server 30 through the communication unit 13 (S104). For example, the control unit 11 of the first terminal 10-1 specifies a game card with a checkbox being checked in a submission screen G103 shown in FIG. 5 as the game card selected as a submission card, and sends submission card information including a card ID and a serial number of the game card selected as the submission card to the server 30.

The control unit 31 of the server 30 receives the submission card information from the first terminal 10-1 through the communication unit 33 (S302), and registers the received submission card information in the owned game object information table TBL103 (S304).

For example, upon receiving the submission card information from the first terminal 10-1, the control unit 31 of the server 30 updates a value of "submit flag" of the record specified by the card ID and the serial number of the submission card to "1" in the owned game object information table TBL103, and sets the game card specified by the submission card information as a submission card.

[4.2. Exchange Request Processing]

Next, referring to FIG. 22, an example of the processing will be discussed in a case where the second user requests the first user to exchange one or more desired card selected from the submission cards of the first user for one or more offered cards selected from the game cards owned by the second user. The processing in FIG. 22 corresponds to the processing described in the example of the screen shown in FIGS. 7 to 10. In the following, the first user is also referred to as an exchange requested user, and the second user is also referred to as an exchange requesting user.

Figure 22:
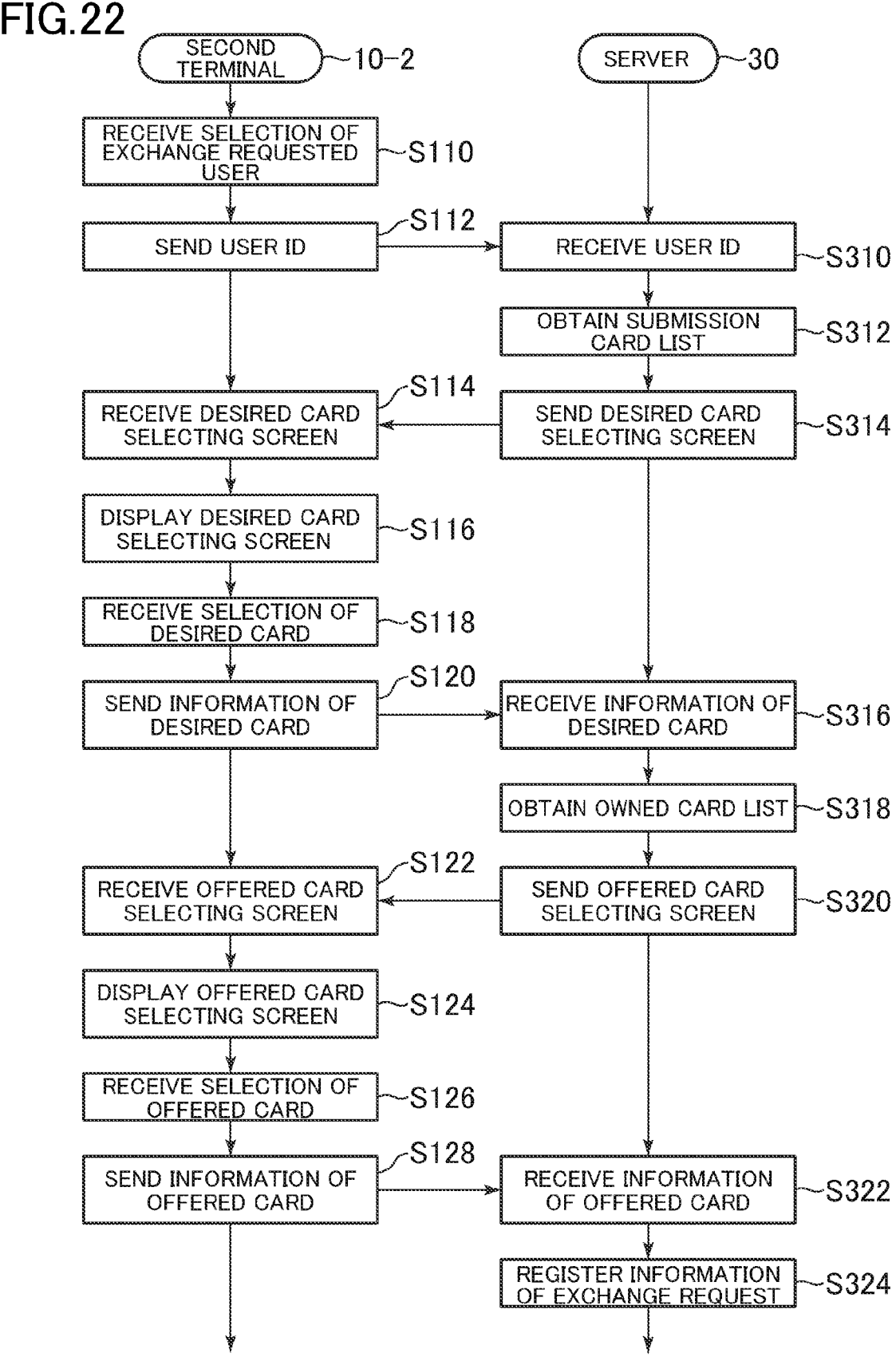
FIG. 22 is a sequence diagram of exchange request processing.

As shown in FIG. 22, the control unit 11 of the second terminal 10-2 operated by the second user receives a selection of the exchange requested user from the second user through the input unit 14 (S110). For example, while the search result display screen image G201 shown in FIG. 7 is displayed, the control unit 11 of the second terminal 10-2 receives an operation to select one of the users displayed in the display area A2110 as an exchange requested user. That is, the control unit 11 of the second terminal 10-2 receives the operation to select the display area A2111 or the display area A2112, for example, thereby receiving the selection of the exchange requested user. The following explains a case where the first user is selected as an exchange requested user.

The control unit 11 of the second terminal 10-2 sends a user ID of the exchange requested user (first user) selected by the second user to the server 30 through the communication unit 13 (S112).

The control unit 31 of the server 30 receives the user ID of the exchange requested user (first user) from the second terminal 10-2 through the communication unit 33 (S310).

Subsequently, the control unit 31 of the server 30 obtains a list (submission card list) of the submission cards of the exchange requested user from the owned game object information table TBL103 (S312). For example, the control unit 31 of the server 30 obtains, as the submission card list, a list of the game cards each having a card ID and a serial number with a submit flag "1" among the records associated with the user ID in the owned game object information table TBL103 received in S310. The control unit 31 of the server 30 sends data for displaying the desired card selecting screen image G2200 (FIG. 8), in which the second user selects a desired card from the submission cards of the exchange requested user (first user), to the second terminal 10-2 through the communication unit 33 based on the obtained submission card list (S314).

Next, the control unit 11 of the second terminal 10-2 receives the data of the desired card selecting screen image G2200 form the server 30 through the communication unit 13 (S114). The control unit 11 of the second terminal 10-2 displays the desired card selecting screen image G2200 on the display unit 15 of the second terminal 10-2 based on the received data (S116).

The control unit 11 of the second terminal 10-2 receives, from the second user, a selection of the desired card from the submission cards in the desired card selecting screen image G2200 displayed on the display unit 15 (S118).

Next, the control unit 11 of the second terminal 10-2 sends information of the desired card selected by the second user (e.g., card ID and serial number) to the server 30 through the communication unit 13 (S120).

The control unit 31 of the server 30 receives the information of the desired card selected by the second user from the second terminal 10-2 through the communication unit 33 (S316).

Next, the control unit 31 of the server 30 obtains a list (owned card list) of the game cards (owned cards) of the exchange requesting user (second user) from the owned game object information table TBL103 (S318). For example, the control unit 31 of the server 30 obtains, as the owned card list, the list of the game cards each having a card ID and a serial number associated with the user ID of the second user in the owned game object information table TBL103. The control unit 31 of the server 30 sends data for displaying the offered card selecting screen image G2300 (FIG. 9), in which the second user selects the offered card from the owned cards of the exchange requesting user (second user), to the second terminal 10-2 through the communication unit 33 based on the obtained owned card list (S320).

Next, the control unit 11 of the second terminal 10-2 receives the data of the offered card selecting screen image G2300 from the server 30 through the communication unit 13 (S122). The control unit 11 of the second terminal 10-2 then displays the offered card selecting screen image G2300 on the display unit 15 of the second terminal 10-2 based on the received data (S124).

The control unit 11 of the second terminal 10-2 receives, from the second user, a selection of the offered card from the owned cards in the offered card selecting screen image G2300 displayed on the display unit 15 (S126).

Next, the control unit 11 of the second terminal 10-2 sends information of the offered card selected by the second user (e.g., card ID and serial number) to the server 30 through the communication unit 13 (8128).

The control unit 31 of the server 30 receives the information of the offered card selected by the second user from the second terminal 10-2 through the communication unit 33 (S322). In this example, the control unit 31 of the server 30 receives information of the desired card and the offered card from the second user, thereby receiving the request (exchange request) from the second user for an exchange of the desired card of the first user for the offered card of the second user.

Upon receiving the exchange request from the second user, the control unit 31 of the server 30 registers the information of the exchange request in the exchange request information table TBL104 (S324). For example, the control unit 31 of the server 30 registers information identifying the exchange request from the second user, such as an exchange request ID, a requesting user ID (user ID of the second user), a requested user ID (user ID of the first user), the desired card (information received in S316), the offered card (information received in S322), a request receiving date and time (e.g., receiving date and time in S322, S316, S310), and a status flag (initial value 0), in the exchange request information table TBL104 in association with one another.

[4.3. Exchange Request Accepting Processing]

Next, referring to FIG. 23, an example of the processing will be discussed in which the first user confirms and accepts an exchange request for the first user. The processing shown in FIG. 23 corresponds to the processing described in the example of the screen shown in FIGS. 11, 12, and 14.

Figure 23:
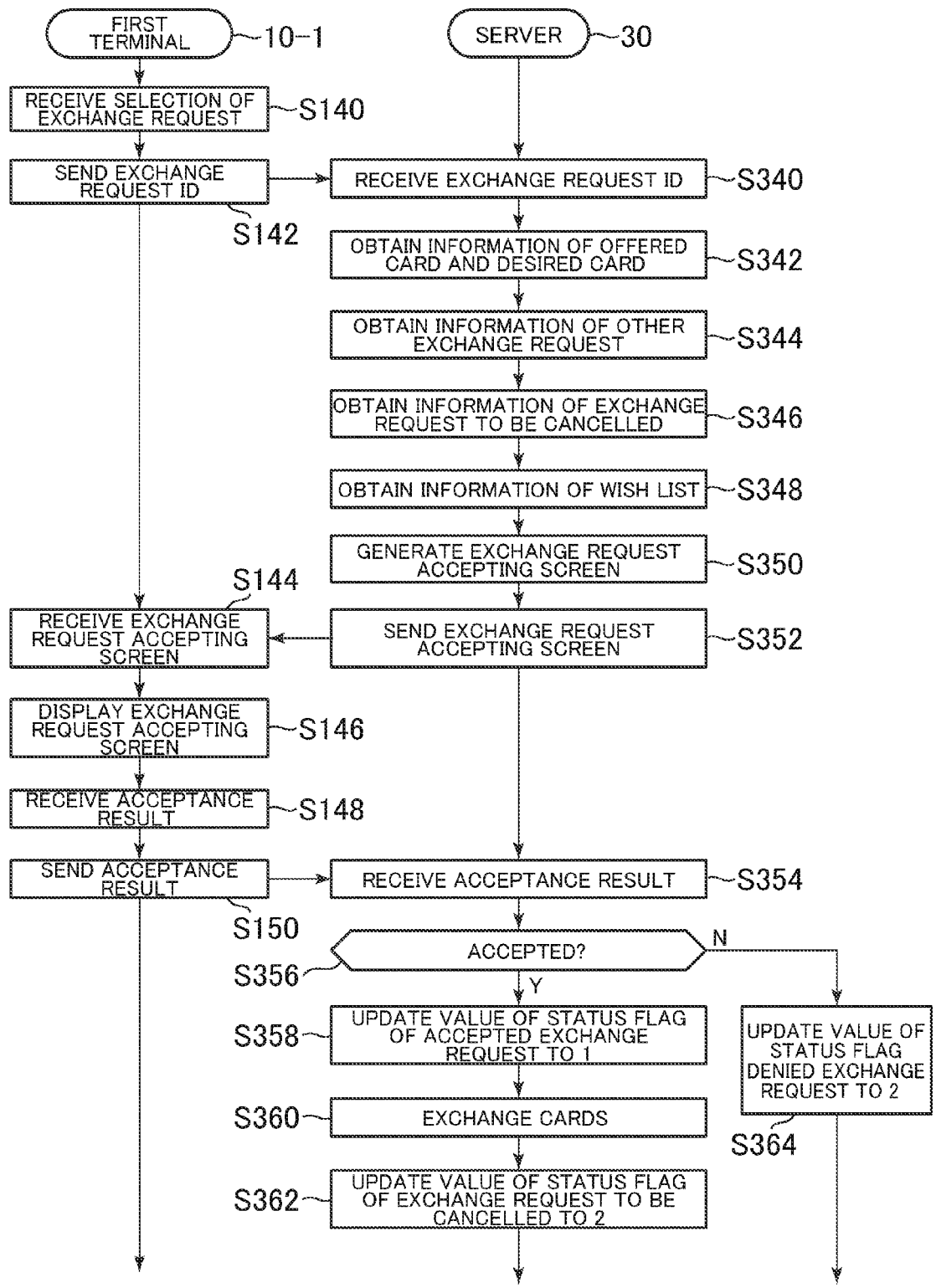
FIG. 23 is a sequence diagram of exchange execution controlling processing.

As shown in FIG. 23, the control unit 11 of the first terminal 10-1 operated by the first user receives, from the first user through the input unit 14, a selection of an exchange request among from the exchange requests directed to the first user (S140). For example, while the exchange request list screen image G1400 shown in FIG. 11 is displayed, the control unit 11 of the first terminal 10-1 receives an operation to select one of the exchange requests displayed in the display area A1410. That is, the control unit 11 of the second terminal 10-2 receives the operation to select the display area A1411 or the display area A1412, for example, thereby receiving the selection of the exchange request.

The control unit 11 of the first terminal 10-1 sends an exchange request ID for identifying the exchange request selected by the first user to the server 30 through the communication unit 13 (S142).

The control unit 31 of the server 30 receives the exchange request ID from the first terminal 10-1 through the communication unit 33 (S340). The control unit 31 of the server 30 then obtains the information described below from the storage unit 32 based on the received exchange request ID.

The control unit 31 of the server 30 obtains, from the exchange request information table TBL104, information about the offered card and the desired card each associated with the exchange request ID obtained in S340 (S342). For example, in the exchange request information table TBL104, the control unit 31 of the server 30 obtains a list of game cards (card ID and serial number) stored in "offered cards" associated with the exchange request ID received in S340 as information about the offered card. Further, in the exchange request information table TBL104, the control unit 31 of the server 30 obtains a list of game cards (card ID and serial number) stored in "desired cards" associated with the exchange request ID received in S340 as information about the desired card.

The control unit 31 of the server 30 obtains, from the exchange request information table TBL104, information about exchange requests in which the game card obtained in S342 as information of the offered game card is set as "offered card" and which is other than the exchange request identified by the exchange request ID received in S340 (hereinafter, overlapping exchange request information) (S344). For example, the control unit 31 of the server 30 obtains, for each of the game cards (card ID and serial number) obtained in S342 from the exchange request information table TBL104, an exchange request ID (other than the exchange request ID received in S340) having such a game card as item of "offered card." In this way, the control unit 31 of the server 30 obtains information on other exchange requests than the exchange request ID received in S340 for each of the game cards obtained in S342 as information about the offered game card.

The control unit 31 of the server 30 obtains information about other exchange requests to be cancelled as a result of accepting the exchange request having the exchange request ID received in S340 (i.e., executing an exchange based on the exchange request) (S346). For example, the control unit 31 of the server 30 obtains information (hereinafter cancel exchange request information) about an exchange request, in which one of the game cards obtained from the exchange request information table TBL104 as information of the desired game card in S342 is included as "desired card" and which are other than the exchange request identified by the exchange request ID received in S340.

The control unit 31 of the server 30 obtains information about the wish list of the first user (exchange requested user) (S348). For example, in the exchange request information table TBL104, the control unit 31 of the server 30 obtains a user ID, which is stored in the items of the requested user ID associated with the exchange request ID received in S340, as the user ID of the first user. The control unit 31 of the server 30 then obtains, in the user information table TBL102, the card ID stored in the wish list associated with the user ID of the first user as information of the wish list.

Subsequently, the control unit 31 of the server 30 generates data for displaying the exchange request accepting screen image G1500 (FIG. 12), which is an image for inquiring the first user whether to accept the exchange request identified by the exchange request ID based on the information obtained in S342 to S348 (S350). For example, regarding the exchange request accepting screen image G1500 shown in FIG. 12, the information of the processing object P15121 in the display area A1510 is generated based on the information obtained in S342, and the information in the display area A1512 is generated based on the information obtained in S344. Further, the information in the display area A1520 is generated based on the information obtained in S346, and the frame images P15111 and P15211 are generated based on the information obtained in S348.

The control unit 31 of the server 30 sends the data generated in S350 for displaying the exchange request accepting screen image G1500 to the first terminal 10-1 through the communication unit 33 (S352).

The control unit 11 of the first terminal 10-1 receives the data for displaying the exchange request accepting screen image G1500 from the server 30 through the communication unit 13 (S144). The control unit 11 of the first terminal 10-1 displays the exchange request accepting screen image G1500 on the display unit 15 of the first terminal 10-1 based on the received data (S146).

The control unit 11 of the first terminal 10-1 receives a result based on an operation received from the first user through the input unit 14 (S148). For example, while the exchange request accepting screen image G1500 shown in FIG. 12 is displayed, the control unit 11 of the first terminal 10-1 receives an operation to select either one of acceptance and denial of the exchange request. That is, the control unit 11 of the first terminal 10-1 receives the selection of either of the processing object P1501 and the processing object P1502 in the exchange request accepting screen image G1500 shown in FIG. 12, thereby receiving the result. For example, when the processing object P1501 is selected, the control unit 11 of the first terminal 10-1 determines that the exchange request is accepted, and when the processing object P1502 is not selected (i.e., denied), the control unit 11 of the first terminal 10-1 determines that the exchange request is not accepted.

The control unit 11 of the first terminal 10-1 sends the received result to the server 30 through the communication unit 13 (S150). The result includes, for example, information about an exchange request ID and either one of acceptance and denial.

The control unit 31 of the server 30 receives the acceptance result from the first terminal 10-1 through the communication unit 33 (S354). The control unit 31 of the server 30 then determines whether the exchange is accepted based on the received acceptance result (S356).

When the exchange is accepted (S356:Y), the control unit 31 of the server 30 updates the value of the status flag associated with the exchange request ID selected by the first user in the exchange request information table TBL104 to "1" (S358). The control unit 31 of the server 30 executes an exchange of the desired card for the offered card between the first user (exchange requested user) and the second user (exchange requesting user) based on information about the desired card and the offered card in the exchange request ID selected by the first user (S360). That is, the control unit 31 of the server 30 terminates the association between the user ID and the desired card of the first user in the owned game object information table TBL103, and newly associates the user ID with the offered card of the first user. Further, the control unit 31 of the server 30 terminates the association between the user ID and the offered card of the second user in the owned game object information table TBL103, and newly associates the user ID and the desired card of the second user.

The control unit 31 of the server 30 updates the value of the status flag, which is stored in the exchange request information table TBL104 in association with the exchange request ID to be cancelled, to "2" (deny/cancel) based on the cancel exchange request information obtained in S346 regarding the accepted exchange request ID (S362).

When the exchange is not accept (S356:N), the control unit 31 of the server 30 updates the value of the status flag associated with the exchange request ID selected by the first user in the exchange request information table TBL104 to "2" (deny/cancel) (S364).

[4.4. Exchange Request List Display Processing]

Next, referring to FIG. 24, an example of the processing will be discussed in a case where a list of the exchange requests to the first user in which a game card selected by the first user is selected as a desired card is displayed. The processing shown in FIG. 24 corresponds to, for example, the processing for displaying the exchange request list screen image G1600 shown in FIG. 13 when the processing object P15121 is selected in the exchange request accepting screen image G1500 shown in FIG. 12.

Figure 24:
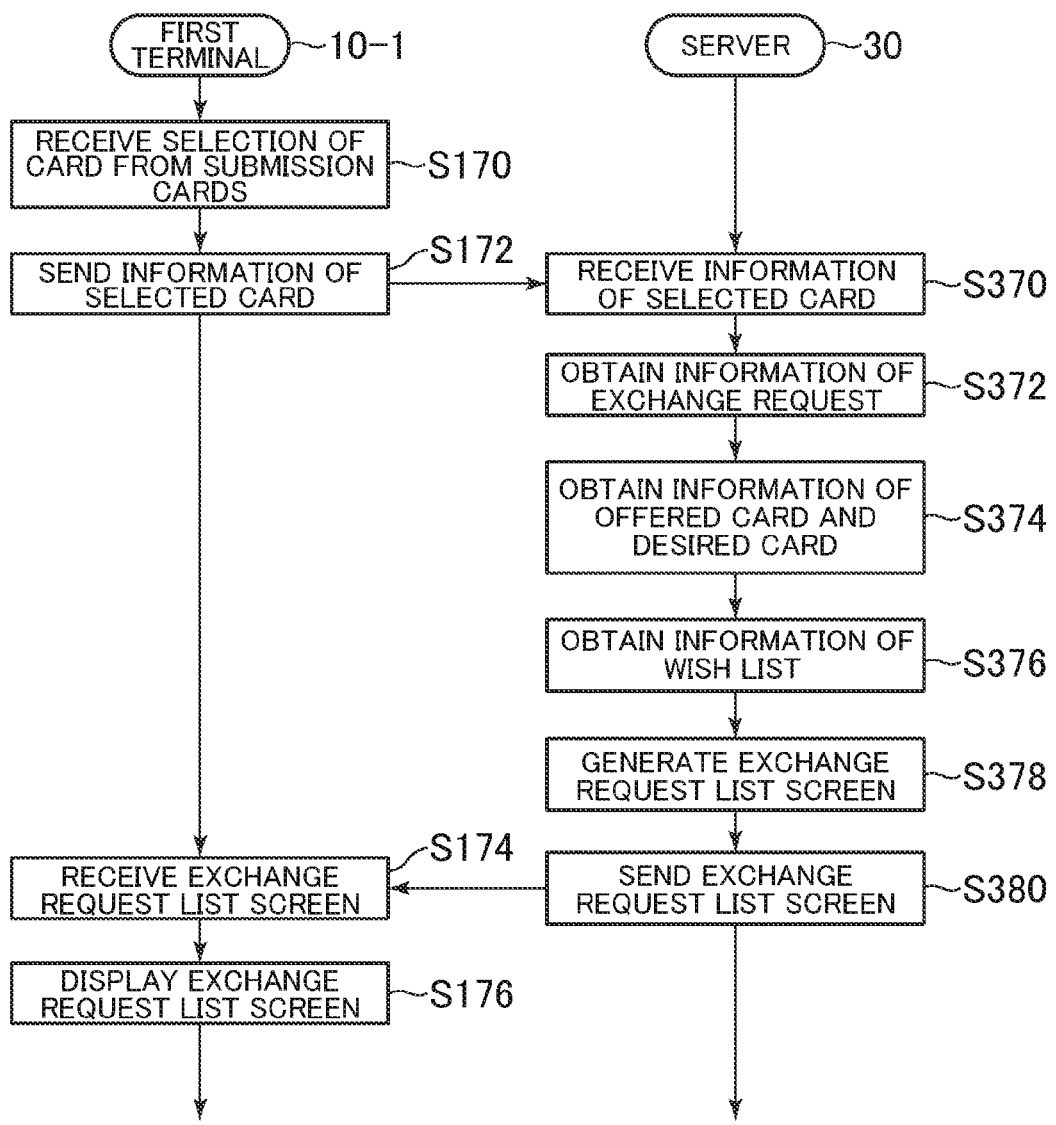
FIG. 24 is a sequence diagram of list displaying processing of an exchange request for a selected card.

As shown in FIG. 24, the control unit 11 of the first terminal 10-1 operated by the first user receives, from the first user through the input unit 14, a selection of a submission card from the submission cards of the first user (S170). For example, while the exchange request accepting screen image G1500 shown in FIG. 12 is displayed, the control unit 11 of the first terminal 10-1 receives an operation to select one of the submission cards. That is, the control unit 11 of the first terminal 10-1 receives an operation to select the processing object P15121 in the exchange request accepting screen image G1500 shown in FIG. 12, thereby receiving the selection of the submission card. In the following, the submission card selected by the first user in S170 is referred to as a selected card.

The control unit 11 of the first terminal 10-1 sends information (card ID, serial number) of the submission card selected by the first user to the server 30 through the communication unit 13 (S172).

The control unit 31 of the server 30 receives the information (card ID, serial number) of the selected submission card from the first terminal 10-1 through the communication unit 33 (S370). The control unit 31 of the server 30 obtains the information described below from the storage unit 32 based on the information about the selected submission card.

The control unit 31 of the server 30 obtains, from the exchange request information table TBL104, information (exchange request ID) about one or more exchange requests that include the selected submission card in desired cards (S372).

The control unit 31 of the server 30 obtains, from the exchange request information table TBL104, information about an offered card and a desired card for each exchange request ID obtained in S372 (S374).

The control unit 31 of the server 30 obtains information about the wish list of the first user (exchange requested user) (S376). For example, the control unit 31 of the server 30 obtains, as information of the wish list, a card ID stored in the wish list associated with the user ID of the first user in the user information table TBL102.

Subsequently, the control unit 31 of the server 30 generates data for displaying the exchange request list screen image G1600 (FIG. 13) indicating a list of the exchange requests in which the selected game card is set as a desired card based on the information obtained in S372 to S376 (S378). For example, regarding the exchange request list screen image G1600 shown in FIG. 13, the information in the display area A1610 is generated based on the information obtained in S372 and S374, and the frame images P16111 and P16121 are generated based on the information obtained in S376.

The control unit 31 of the server 30 sends the data generated in S378 for displaying the exchange request list screen image G1600 to the first terminal 10-1 through the communication unit 33 (S380).

The control unit 11 of the first terminal 10-1 receives the data for displaying the exchange request list screen image G1600 from the server 30 through the communication unit 13 (S174). The control unit 11 of the first terminal 10-1 then displays the exchange request list screen image G1600 on the display unit 15 of the first terminal 10-1 based on the received data (S176).

The above described is an example of the processing executed in the game system 1.

According to the game system 1 of this embodiment described above, the second user who requests an exchange of the desired card owned by the first user and the offered card owned by the second user can select any combination of game cards as at least one of a desired card and an offered card in one exchange. For example, the second user can select any combination of game cards as a desired card in one exchange, and also select any combination of game cards as an offered card in such an exchange. In this case, the second user can freely determine the number of game cards to select as desired cards in one exchange or which game card to select as a desired card in one exchange. Further, the second user can freely determine the number of game cards to select as offered cards in one exchange or which game card to select as an offered card in one exchange. This enables to improve the freedom of an exchange, and consequently, can reduce loss of opportunity for exchanging game cards.

The game system 1 allows the second user to select a desired card from the game cards selected by the first user as offering candidate game cards. According to the game system 1, a game card that the second user can select as a desired card is limited to a game card that the first user selects as an offering candidate game card, that is, a game card that the first user considers offering to another user. This enables to eliminate the possibility that a game card that the first user does not wish to offer to another user is selected by the second user as a desired card. In other words, it is possible to prevent an exchange request having low possibility of being accepted by the first user.

Further, according to the game system 1, multiple exchange requests that select the same game card associated with one user identification information as a desired card are received. As such, the first user can select and accept an exchange request advantageous for the user from the multiple exchange requests.

Further, according to the game system 1, in a case where one of the multiple exchange requests, which select the same game associated with one user identification information as a desired card, is accepted by the first user, such a game card is removed from the game cards associated with the first user identification information. As such, the first user can no longer receive the other exchange requests in the multiple exchange requests. In this regard, according to the game system 1, the other exchange requests are cancelled in the multiple exchange requests, and thus the exchange requests that the first user can no longer accept are cancelled. This enables the first user to save labor for cancelling the exchange requests that cannot be executed, for example.

Further, according to the game system 1, the desire selection screen image, in which at least one of the game cards associated with the first user identification information is selected as a desired card, displays information about an existing exchange request that selects a game card associated with the first user identification information as a desired card. As such, when selecting a game card associated with the first user identification information as a desired card, the second user can recognize whether the exchange request regarding the game card is already made, for example. That is, the second user can determine whether to select a game card as a desired card based on whether an exchange request regarding the game card is already made, for example.

Further, according to the game system 1, the exchange request list screen image, which shows a list of the exchange requests to the first user identification information, preferentially or separately displays an exchange request selecting a game card that the first user wishes to obtain as an offered object among the exchange requests to the first user identification information. As such, the first user can easily distinguish an exchange request that allows the first user to obtain his/her desired game card among from the exchange requests to his/her identification information. As a result, for example, the first user can easily accept the exchange request that allows the first user to obtain his/her desired game card.

Further, according to the game system 1, the exchange request content screen image, which shows content of an exchange request to the first user identification information, preferentially or separately displays a game card that the first user wishes to obtain among the game cards that are selected as offered cards in the exchange request. As such, the first user can easily recognize whether he/she can obtain his/her desired game card in the exchange request. As a result, for example, the first user can easily accept the exchange request that allows the first user to obtain his/her desired game card.

Further, according to the game system 1, the exchange request content screen image, which shows content of one exchange request to the first user, displays information about another exchange request in which the same game card as the game card selected as a desired card in the one exchange request is selected as a desired card. As such, when confirming the content of the one exchange request, the first user can recognize whether there is another exchange request to the same game card. As a result, for example, the first user can determine whether to accept the exchange request based on whether there is another exchange request to the same game card.

Further, according to the game system 1, the display device of the first user displays information about an exchange request in which the game card selected by the first user is selected as a desired card. As such, the first user selects at least one of the game cards associated with the first user, thereby recognizing whether there is an exchange request in which the game card is selected as a desired card or recognizing the content of the exchange request, for example. In other words, the first user can recognize whether there is an exchange request in which a specific game card is selected as a desired card or recognize the content of the exchange request, for example.

Further, according to the game system 1, in an offer selection screen image for selecting at least one of the game cards associated with the second user identification information as an offered card, a game card that the first user wishes to obtain is preferentially or separately displayed. As such, the second user can easily recognize which game card is a game card that the first user wants to obtain. As a result, the second user can easily select the first user's desired game card as an offered card.

Further, according to the game system 1, the display device of the first user displays information about an exchange request, which is other than exchange requests selected by the first user and in which the same game card as the game card selected as a desired card in the exchange request selected by the first user is selected as a desired card. As such, the first user can easily recognize whether there is another exchange request to the same game card as the exchange request selected by the first user (i.e. another exchange request that is not executable when an exchange that is requested due to the exchange request selected by the first user is executed) or the content of another exchange request. As a result, for example, the first user can determine whether to accept the exchange request based on whether there is another exchange request to the same game card as the exchange request (i.e., another exchange request that is not executable when an exchange requested in the exchange request is executed) or based on the content of another exchange request.

[5. Variation]

The present invention is not to be limited to the above described embodiment.

1. In the embodiment described above, the exchange request accepting screen image G1500 shown in FIG. 12 shifts to the exchange request list screen image G1600 shown in FIG. 13. That is, in a case where the first user selects one of the cards (submission cards) owned by the first user and displayed on the exchange request accepting screen image G1500, the exchange request list screen image G1600 indicating a list of exchange requests to the selected game card is displayed.

However, a screen image other than the exchange request accepting screen image G1500 may shift to the exchange request list screen image G1600. For example, a screen image showing a list of submission cards of the first user may shift to the exchange request list screen image G1600. That is, when one of the game cards in the list of the submission cards of the first user is selected, the exchange request list screen image G1600 showing a list of exchange requests to the selected game card may be displayed.

2. For example, in a case where one submission card already receives multiple exchange requests on the desired card selecting screen image G2200 shown in FIG. 8, the display area of the one submission card may display images, such as icons, respectively corresponding to the multiple exchange requests. In this case, when one of the icons respectively corresponding to the multiple exchange requests is selected, information of the exchange request corresponding to the selected icon may be displayed.

3. For example, in the exchange request accepting screen image G1500 shown in FIG. 12, the display area A1520 displaying information of an exchange request that is to be cancelled when the target exchange request is accepted may not be included in the exchange request accepting screen image G1500. For example, when the processing object P1501 is selected, the display area A1520 may be displayed in another screen, such as a pop-up window.

4. For example, in the submission card search screen image G2000 shown in FIG. 6, information used as search conditions of a game card is not limited to a name of the game card. For example, search conditions of a game card may be one or a combination of items of attribute information of the game card, such as a name, rarity, distributed number, special ability, offensive power, defensive power, cost, sale price, and an appearance day and time.

5. For example, in the game system 1 described above, the tables stored in the data storage unit 300, such as the game object information table TBL101, the user information table TBL102, the owned game object information table TBL103, and the exchange request information table TBL104, are stored in the server 30, but the embodiments are not limited thereto. For example, the above tables may be stored in a device (e.g., terminal 10) other than the server 30, or in multiple devices (e.g., server 30, terminal 10) included in the game system 1. Alternatively, multiple devices may redundantly store at least a part of the tables.

Further, for example, the at least part of the tables may be respectively stored in the server 30 and the terminal 10, or only in the server 30 or the terminal 10. In a case where the server 30 and the terminal 10 store information of the same table, the server 30 and the terminal 10 may synchronize information of the tables respectively stored in the server 30 and the terminal 10.

6. For example, the first terminal 10-1 and the second terminal 10-2 may communicate with each other by P2P without through the server 30. In this case, for example, either one of the first terminal 10-1 and the second terminal 10-2 may also serve the function of the server 30. That is, in this case, either one of the first terminal 10-1 and the second terminal 10-2 may further function as the data storage unit 300, the display control unit 310, the offering candidate selection receiving unit 320, the exchange request receiving unit 330, the exchange request selection receiving unit 340, the game object selection receiving unit 350, the acceptance receiving unit 360, the exchange executing unit 370, and the exchange request cancelling unit 380.

7. For example, the game object exchanged between the first user and the second user is not limited to a game card. For example, the first user and the second user may exchange game cards, game characters, game items, game points, or combinations of these items.

[6. Appendixes]

From the foregoing, the present invention will be understood as described below, for example. In the following, the numerals given in accompanying drawings are shown in parentheses for the purpose of easier understanding, although the invention is not limited to the embodiments shown in the drawings.

There is provided a game system according to one embodiment of the present invention comprising at least one processor configured to: receive, from a second user identified by second user identification information, an exchange request for exchanging a desired game object for an offered game object, the desired game object being selected from a first group of game objects associated with first user identification information of a first user, the offered game object being selected from a group of second game objects associated with the second user identification information; exchange the desired game object for the offered game object based on the exchange request; and receive a selection of any combination of game objects which comprise the desired game object and/or the offered game object, in an exchange.

There is provided an exchange request receiving device according to one embodiment of the present invention comprising at least one processor configured to: receive, from a user identified by second user identification information, an exchange request comprising a desired game object for an offered game object, the desired game object being selected from a group of game objects associated with first user identification information, the offered game object being selected from a group of game objects associated with the second user identification information; and receive, from the user, a selection of any combination of game objects which comprise the desired game object and/or the offered game object, in an exchange.

There is provided a program according to one embodiment of the present invention is a program for causing a computer to function as the game system described above or as the exchange request receiving device described above.

There is provided a control method of a game system according to one embodiment of the present invention comprising: receiving, from a second user identified by second user identification information, an exchange request for exchanging a desired game object for an offered game object, the desired game object being selected from a first group of game objects associated with first user identification information of a first user, the offered game object being selected from a group of second game objects associated with the second user identification information; exchanging the desired game object for the offered game object based on the exchange request; and receiving a selection of any combination of game objects which comprise the desired game object and/or the offered game object, in an exchange.

There is provided a control method of an exchange request receiving device according to one embodiment of the present invention comprising: receiving, from a user identified by second user identification information, an exchange request comprising a desired game object for an offered game object, the desired game object being selected from a group of game objects associated with first user identification information, the offered game object being selected from a group of game objects associated with the second user identification information; and receiving, from the user, a selection of any combination of game objects which comprise the desired game object and/or the offered game object, in an exchange.

There is provided an information storage medium according to one embodiment of the present invention is a computer-readable information storage medium having the program described above recorded thereon.

According to one aspect of the present invention, the at least one processor further being configured to: receive, from the first user identified by the first user identification information, a selection comprising the first game objects as an offering candidate game object; and receive a selection comprising the game objects as the desired game object from the second user, the game objects being selected by the first user as the offering candidate game object.

According to one aspect of the present invention, the at least one processor further being configured to: receive a plurality of exchange requests in which the same game object is selected as the desired game object; receive an acceptance of any one of the plurality of the exchange requests from the first user identified by the first user identification information; and if the first user accepts an exchange request, exchange the desired game object in the exchange request for the offered game object in the exchange request.

According to one aspect of the present invention, the at least one processor further being configured to cancel, if the first user accepts the exchange request, other exchange requests among the exchange requests.

According to one aspect of the present invention, the at least one processor further being configured to execute control for displaying a desire selection screen image on a display device of the second user, the desire selection screen image being for selecting the first game object as the desired game object, and the desire selection screen image displaying information about an existing exchange request in which a first game object is selected as the desired game object.

According to one aspect of the present invention, the at least one processor further being configured to execute control for displaying an exchange request list screen image on the display device of the first user based on list data that is stored in association with the first user identification information and indicates wish game objects the first user wishes to obtain, where the game objects were identified by the first user identification information, the exchange request list screen image showing a list of exchange requests to the first user identification information, and the exchange request list screen image preferentially or separately displaying an exchange request, in which the wish game object included in the list data is selected as the offered object, among from the exchange requests to the first user identification information.

According to one aspect of the present invention, the at least one processor further being configured to execute control for displaying an exchange request content screen image on the display device of the first user based on the list data, which is stored in association with the first user identification information and indicates wish game objects that the first user identified by the first user identification information wishes to obtain, the exchange request content screen image showing content of the exchange requests to the first user identification information, and the exchange request content screen image preferentially or separately displaying the wish game object included in the list data among from the game objects selected as the offered game objects in the exchange request.

According to one aspect of the present invention, the at least one processor further being configured to execute control for displaying the exchange request content screen image, which shows content of an exchange request among the exchange requests to the first user identification information, on the display device of the first user identified by the first user identification information, and the exchange request content screen image displaying information about other exchange requests in which the same game object as a game object selected as the desired game object in the exchange request is selected as the desired game object.

According to one aspect of the present invention, the at least one processor further being configured to: receive a selection comprising the first game objects from a first user identified by the first user identification information; and execute control for displaying information about an exchange request, in which a first game object selected by the first user is selected as the desired game object, on the display device of the first user.

According to one aspect of the present invention, the at least one processor further being configured to execute control for displaying an offer selection screen image on the display device of the second user based on list data, which is stored in association with the first user identification information and indicates wish game objects that the first user identified by the first user identification information wishes to obtain, the offer selection screen image being for selecting at least one of the game objects associated with the second user identification information as the offered game object, and the offer selection screen image preferentially or separately displaying the wish game object included in the list data from the second game objects.

According to one aspect of the present invention, the at least one processor further being configured to: receive a selection of any one of the exchange requests to the first user identification information from a first user identified by the first user identification information; and display information about an exchange request, which is different than an exchange request selected by the first user among from the exchange requests and in which the same game object as a game object selected as the desired game object in the exchange request selected by the first user is selected as the desired game object, on the display device of the first user.

What is claimed is:

1. A game system comprising:
   a first terminal of a first user identified by first user identification;
   a second terminal of a second user identified by second user identification; and
   a server configured to;
      receive, from the second terminal, an exchange request for exchanging a desired game object for an offered game object, the desired game object being selected from a first group of game objects associated with the first user identification information, the offered game object being selected from a group of second game objects associated with the second user identification information;
      exchange the desired game object which is stored in the first terminal and/or the server for the offered game object which is stored in the second terminal and/or the server based on the exchange request; and
      receive, from the second terminal, a selection of any combination of game objects which comprise the desired game object and/or the offered game object, in an exchange.

2. The game system according to claim 1, the server further being configured to:
   receive, from the first terminal, a selection comprising the first game objects as an offering candidate game object; and
   receive a selection comprising the game objects as the desired game object from the second terminal, the game objects being selected by the first user as the offering candidate game object.

3. The game system according to claim 1, the server further being configured to:
   receive, from the second terminal a plurality of exchange requests in which the same game object is selected as the desired game object;
   receive an acceptance of any one of the plurality of the exchange requests from the first terminal identified by the first user identification information; and
   if the first user accepts an exchange request, exchange the desired game object in the exchange request for the offered game object in the exchange request.

4. The game system according to claim 3, the server further being configured to cancel, if the first user accepts the exchange request, other exchange requests among the exchange requests.

5. The game system according to claim 1, the server further being configured to execute control for displaying a desire selection screen image on a display device of the second user, the desire selection screen image being for selecting the first game object as the desired game object, and
   the desire selection screen image displaying information about an existing exchange request in which a first game object is selected as the desired game object.

6. The game system according to claim 1, the server further being configured to execute control for displaying an exchange request list screen image on the display device of the first user based on list data that is stored in association with the first user identification information and indicates wish game objects the first user wishes to obtain, where the game objects were identified by the first user identification information,
   the exchange request list screen image showing a list of exchange requests to the first user identification information, and
   the exchange request list screen image preferentially or separately displaying an exchange request, in which the wish game object included in the list data is selected as the offered object, among from the exchange requests to the first user identification information.

7. The game system according to claim 1, the server further being configured to execute control for displaying an exchange request content screen image on the display device of the first user based on the list data, which is stored in association with the first user identification information and indicates wish game objects that the first user identified by the first user identification information wishes to obtain,
   the exchange request content screen image showing content of the exchange requests to the first user identification information, and
   the exchange request content screen image preferentially or separately displaying the wish game object included in the list data among from the game objects selected as the offered game objects in the exchange request.

8. The game system according to claim 1, the server further being configured to execute control for displaying the exchange request content screen image, which shows content of an exchange request among the exchange requests to the first user identification information, on the display device of the first user identified by the first user identification information, and
   the exchange request content screen image displaying information about other exchange requests in which the same game object as a game object selected as the desired game object in the exchange request is selected as the desired game object.

9. The game system according to claim 1, the server further being configured to:
  receive a selection comprising the first game objects from the first terminal; and
  execute control for displaying information about an exchange request, in which a first game object selected by the first user is selected as the desired game object, on the display device of the first user.

10. The game system according to claim 1, the server further being configured to execute control for displaying an offer selection screen image on the display device of the second user based on list data, which is stored in association with the first user identification information and indicates wish game objects that the first user identified by the first user identification information wishes to obtain,
  the offer selection screen image being for selecting at least one of the game objects associated with the second user identification information as the offered game object, and
  the offer selection screen image preferentially or separately displaying the wish game object included in the list data from the second game objects.

11. The game system according to claim 1, the server further being configured to:
  receive a selection of any one of the exchange requests to the first user identification information from the first terminal; and
  display information about an exchange request, which is different than an exchange request selected by the first user among from the exchange requests and in which the same game object as a game object selected as the desired game object in the exchange request selected by the first user is selected as the desired game object, on the display device of the first user.

12. An exchange request receiving device comprising at least one processor configured to:
  receive, from a second terminal of a second user identified by second user identification information, an exchange request comprising a desired game object for an offered game object, the desired game object being selected from a group of game objects associated with first user identification information, the offered game object being selected from a group of game objects associated with the second user identification information; and
  receive, from the second terminal, a selection of any combination of game objects which comprise the desired game object and/or the offered game object, in an exchange.

13. A non-transitory computer-readable information storage medium that stores a program for causing a computer to:
  receive, from a second terminal of a second user identified by second user identification information, an exchange request comprising a desired game object for an offered game object, the desired game object being selected from a group of game objects associated with a first user identification information, the at least one offered game object being selected from a group of game objects associated with the second user identification information; and
  receive, from the second terminal, a selection of any combination of game objects which comprise the desired game object and the offered game object, in an exchange.

* * * * *